United States Patent
Jeon et al.

(10) Patent No.: US 10,389,863 B2
(45) Date of Patent: Aug. 20, 2019

(54) MOBILE TERMINAL AND METHOD FOR CONTROLLING THE SAME

(71) Applicant: LG ELECTRONICS INC., Seoul (KR)

(72) Inventors: Bongjeong Jeon, Seoul (KR); Insuk Kim, Seoul (KR); Jian Choi, Seoul (KR); Namki Kim, Seoul (KR); Sesook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/345,361

(22) Filed: Nov. 7, 2016

(65) Prior Publication Data
US 2017/0134553 A1    May 11, 2017

(30) Foreign Application Priority Data
Nov. 11, 2015   (KR) .................. 10-2015-0158302

(51) Int. Cl.
*H04M 3/00* (2006.01)
*H04M 1/725* (2006.01)
(Continued)

(52) U.S. Cl.
CPC ........ *H04M 1/7253* (2013.01); *G06F 1/1626* (2013.01); *G06F 1/1694* (2013.01);
(Continued)

(58) Field of Classification Search
CPC ............... G08C 17/02; H04M 1/7253; H04M 1/72533; H04M 2250/02; H04M 1/72569;
(Continued)

(56) References Cited

U.S. PATENT DOCUMENTS

2010/0141784 A1* 6/2010 Yoo .................... H04N 5/23219
348/222.1
2011/0319130 A1* 12/2011 Lee .................... H04M 1/72572
455/556.1

(Continued)

FOREIGN PATENT DOCUMENTS

WO    2015167204    11/2015

OTHER PUBLICATIONS

European Patent Office Application Serial No. 16195225.4, Search Report dated Mar. 9, 2017, 6 pages.

*Primary Examiner* — Khoi H Tran
*Assistant Examiner* — B M M Hannan
(74) *Attorney, Agent, or Firm* — Lee, Hong, Degerman, Kang & Waimey PC

(57) ABSTRACT

A mobile terminal includes a camera unit configured to sense an image, a touch screen configured to output image information, a communication unit configured to perform wireless communication with at least one Internet of things (IOT) device, and a controller configured to, when the mobile terminal enters a specific indoor area, control IOT devices included in the sensed image or a previously stored image of the specific indoor area by using the image, wherein the controller stores a plurality of pieces of set information including a state in which at least some of the IOT devices are connected and operational states of the connected IOT devices, and when any one of the plurality of pieces of set information is selected, the controller controls at least some of the IOT devices to be connected to each other and operate according to the selected set information.

20 Claims, 20 Drawing Sheets

(51) Int. Cl.
*H04W 4/70* (2018.01)
*H04W 76/10* (2018.01)
*G06F 3/0484* (2013.01)
*H04L 29/08* (2006.01)
*H04W 4/08* (2009.01)
*G06F 1/16* (2006.01)
*G06F 3/0482* (2013.01)
*G06F 3/0486* (2013.01)
*G06F 3/0488* (2013.01)
*H04W 4/02* (2018.01)

(52) U.S. Cl.
CPC .......... *G06F 3/0482* (2013.01); *G06F 3/0486* (2013.01); *G06F 3/04842* (2013.01); *G06F 3/04845* (2013.01); *G06F 3/04847* (2013.01); *G06F 3/04886* (2013.01); *H04L 67/125* (2013.01); *H04M 1/72569* (2013.01); *H04W 4/08* (2013.01); *H04W 4/70* (2018.02); *H04W 76/10* (2018.02); *G06F 2200/1637* (2013.01); *H04L 67/12* (2013.01); *H04W 4/026* (2013.01)

(58) Field of Classification Search
CPC ....... H04W 88/02; H04W 4/005; H04W 4/08; H04W 76/02; H04W 4/026; G06F 3/04842; G06F 3/04845; G06F 3/04847; H04L 67/125; H04L 67/12
USPC ......................................................... 455/420

See application file for complete search history.

(56) References Cited

U.S. PATENT DOCUMENTS

| | | | |
|---|---|---|---|
| 2013/0258138 A1* | 10/2013 | Ma | H04N 5/272 348/239 |
| 2014/0040829 A1 | 2/2014 | Pastor et al. | |
| 2014/0087660 A1* | 3/2014 | Kim | H04L 12/282 455/41.1 |
| 2014/0373123 A1* | 12/2014 | Kang | H04L 41/22 726/7 |
| 2015/0026779 A1* | 1/2015 | Ilsar | H04W 12/06 726/5 |
| 2015/0133051 A1* | 5/2015 | Jamal-Syed | H04M 1/7253 455/41.2 |
| 2015/0312113 A1 | 10/2015 | Forutanpour et al. | |
| 2015/0319006 A1* | 11/2015 | Plummer | H04L 12/2827 700/83 |
| 2015/0319792 A1* | 11/2015 | Ito | H04W 76/02 370/329 |
| 2015/0327304 A1* | 11/2015 | Tinnakornsrisuphap | H04L 41/0809 709/227 |
| 2015/0339917 A1* | 11/2015 | Messing | G08C 17/02 340/12.5 |
| 2016/0080465 A1* | 3/2016 | Sasaki | H04L 67/025 715/740 |
| 2016/0081133 A1* | 3/2016 | Kim | H04L 63/0876 370/329 |
| 2016/0110056 A1* | 4/2016 | Hong | G06F 3/04812 715/768 |
| 2016/0112434 A1* | 4/2016 | Chung | H04W 4/70 726/4 |
| 2016/0198465 A1* | 7/2016 | Britt | H04W 4/008 455/450 |
| 2016/0381143 A1* | 12/2016 | Malik | H04L 67/125 455/518 |

* cited by examiner

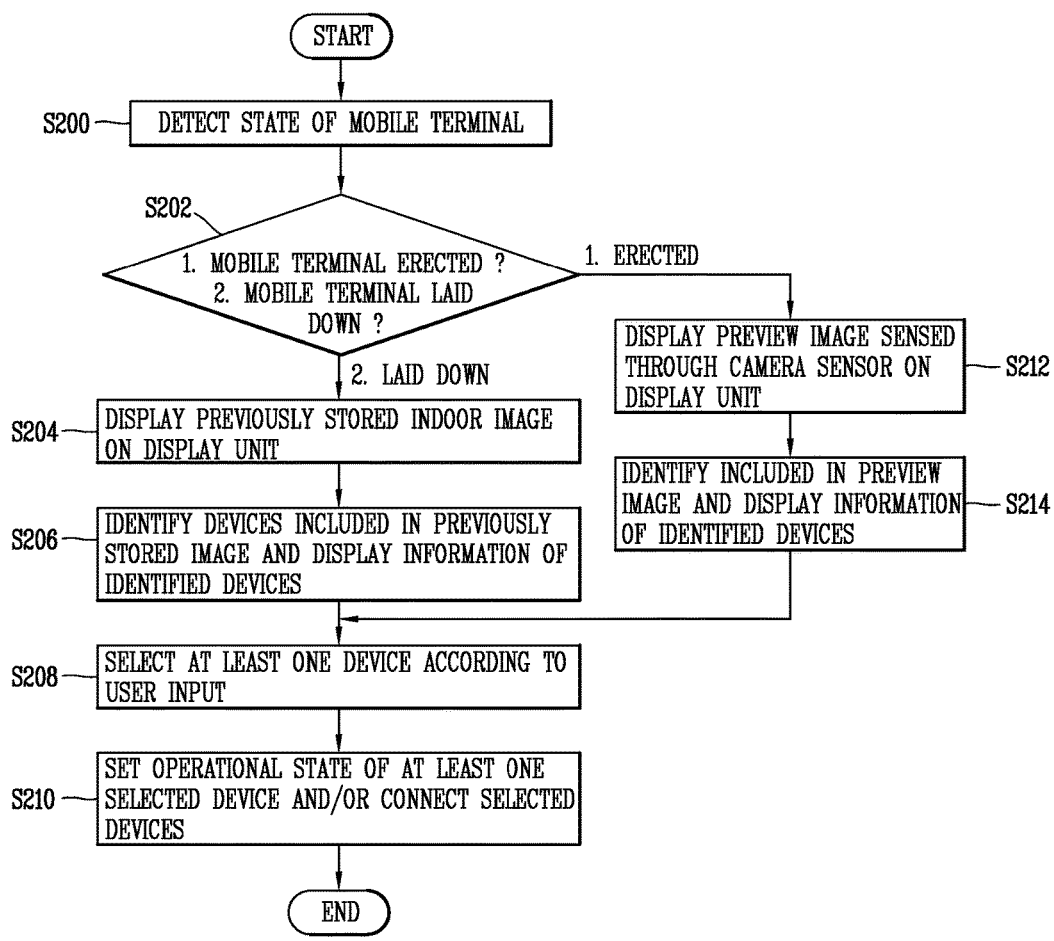

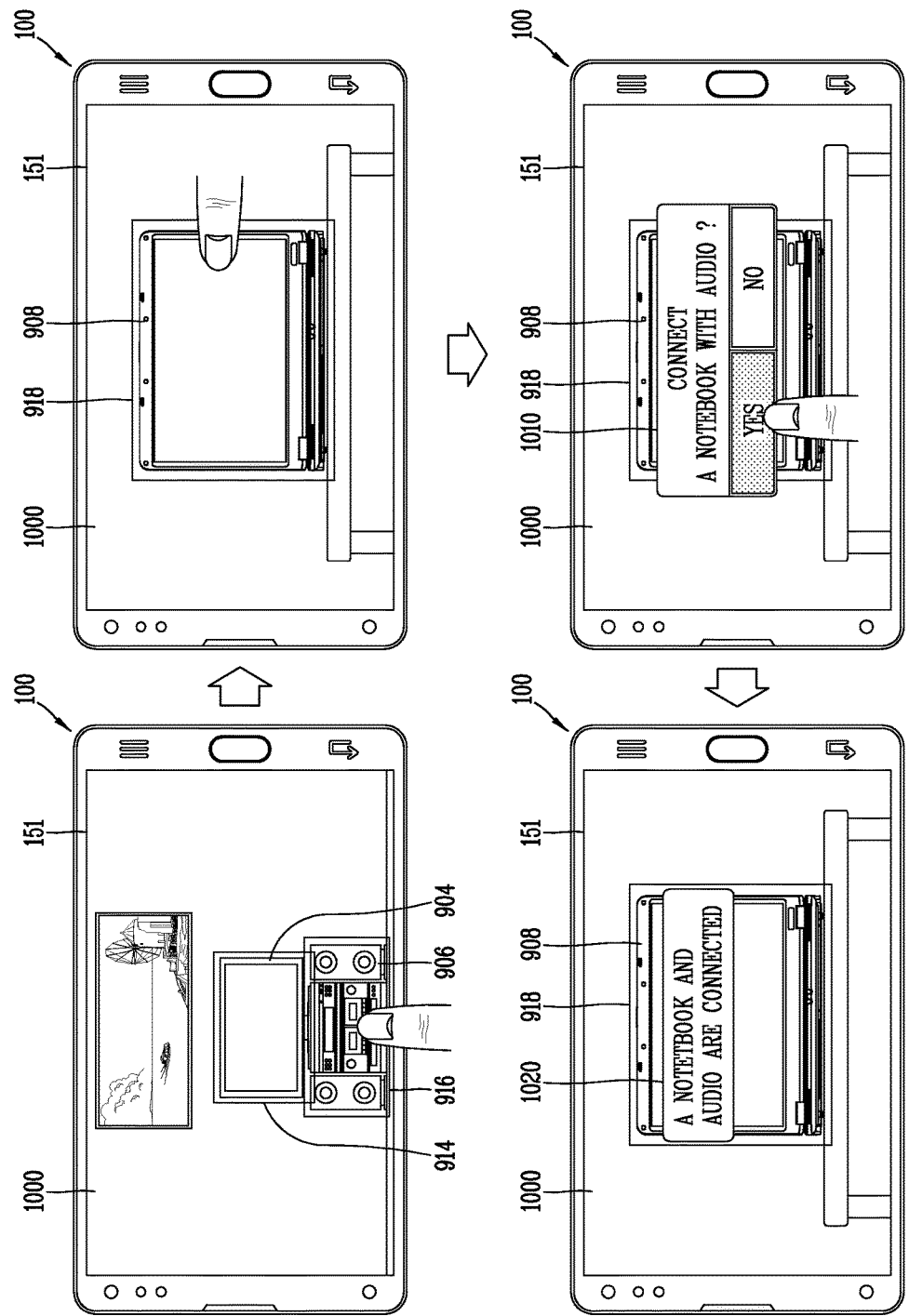

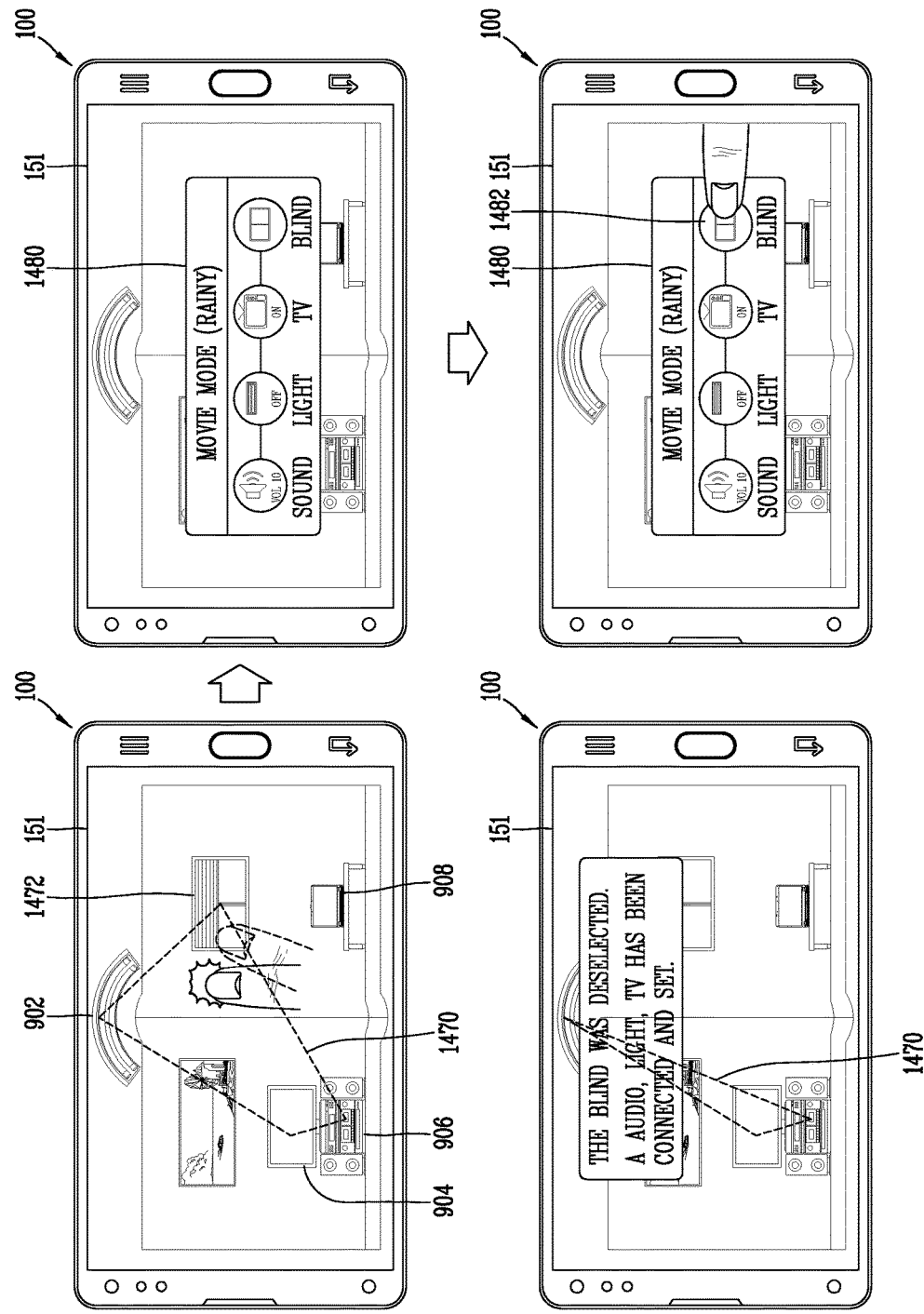

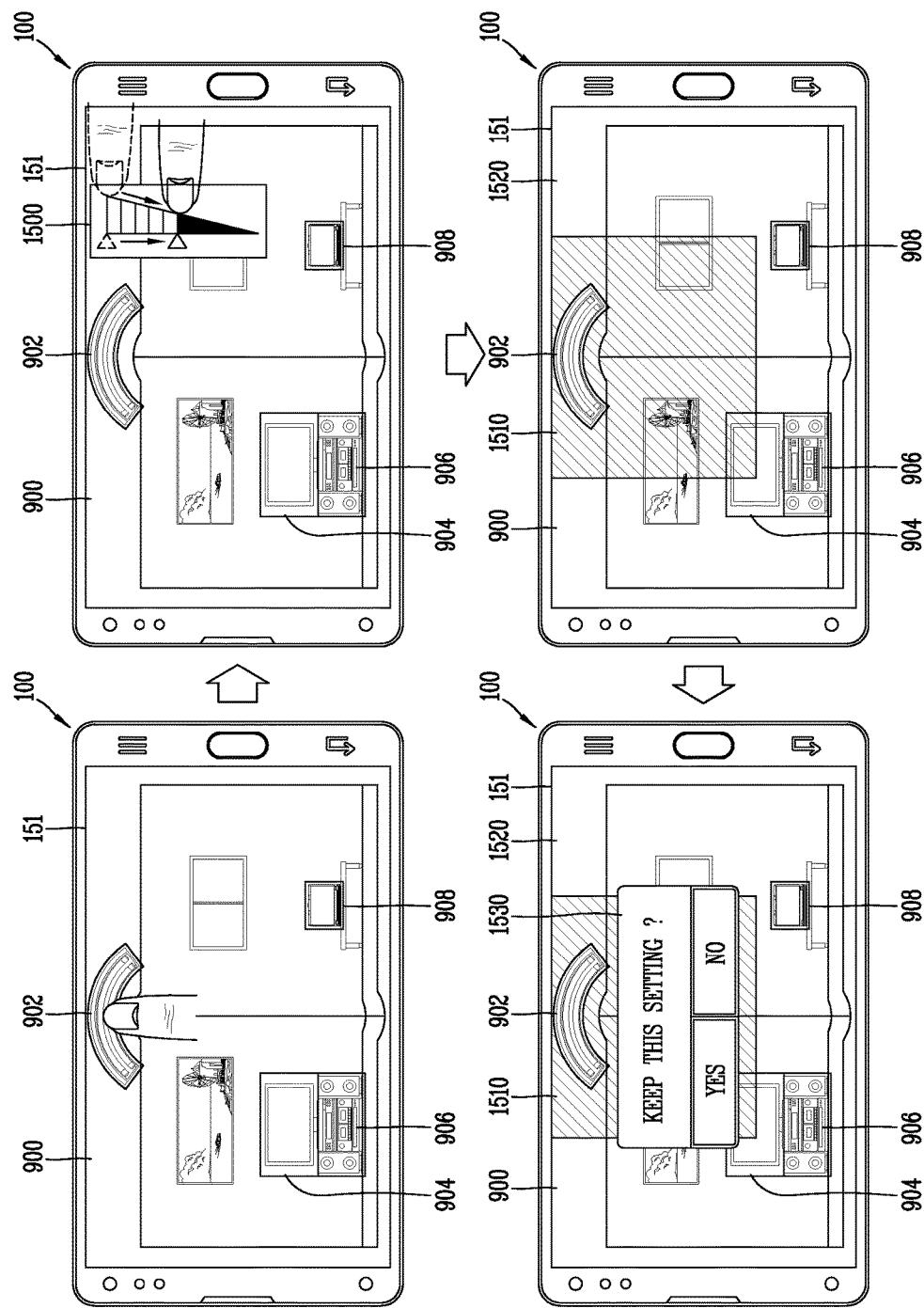

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0158302, filed on Nov. 11, 2015, the contents of which are hereby incorporated by reference herein in its entirety.

BACKGROUND OF THE INVENTION

1. Field of the Invention

The present disclosure relates to a mobile terminal capable of controlling an Internet of things (IOT) device and a method for controlling the same.

2. Background of the Invention

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

Meanwhile, recently, due to the development of technologies, a plurality of devices may be connected via a network. The development of IOT technologies allowing a plurality of devices to form a network so as to be connected with each other currently enables the plurality of devices to share mutual information or provide various functions to users using the network.

Thus, a method for easily managing and controlling a plurality of devices, that is, IOT devices, which are able to communicate with each other have been actively researched, and to this end, a method for managing and controlling the IOT devices through a mobile terminal of a user has also been researched.

SUMMARY OF THE INVENTION

Therefore, an aspect of the detailed description is to provide a mobile terminal having a user interface allowing a user to easily and conveniently manage and control a plurality of Internet of things (IOT) devices, and a method for controlling the mobile terminal.

Another aspect of the detailed description is to provide a mobile terminal capable of enabling a user to identify and control a plurality of IOT devices by using a preview image sensed through a camera of the mobile terminal, to thereby easily manage the IOT devices by intuition, and a method for controlling the mobile terminal.

To achieve these and other advantages and in accordance with the purpose of this specification, as embodied and broadly described herein, A mobile terminal comprising: a camera; a memory configured to store information; a touchscreen configured to display information; a communication unit configured to perform wireless communication with at least one device; and a controller configured to: cause the touchscreen to display an image of a preview image obtained by the camera or a previously stored image, wherein the displayed image includes a plurality of devices and corresponds to a specific indoor area where the mobile terminal is located; cause the memory to store set information comprising connection information of two or more devices of the plurality of devices and operational state information of the two or more devices; and transmit information via the communication unit to cause the two or more devices to be connected to each other according to the stored connection information and to operate according to the stored operational state information in response to a selection of the stored set information.

In an embodiment of the present disclosure, the controller is further configured to: cause the set information to be stored to be associated with a specific situational setting; and cause the memory to differently store multiple set information associated with a same specific situational setting based on corresponding surrounding environment information detected by the mobile terminal when each of the multiple set information is stored.

In an embodiment of the present disclosure, the surrounding environment information comprises a current time and weather information.

In an embodiment of the present disclosure, the controller is further configured to cause the touchscreen to display information for changing an operational state of at least one of the two or more devices based on surrounding environment information detected by the mobile terminal.

In an embodiment of the present disclosure, the displayed information for changing the operational state of the at least one of the two or more devices is further based on the detected surrounding environment information and a current operational state of the two or more devices.

In an embodiment of the present disclosure, the controller is further configured to update the selected set information when an operational state of at least one of the two or more devices is changed according to the displayed information.

In an embodiment of the present disclosure, the controller is further configured to: cause the touchscreen to display graphic objects corresponding to each of the two or more devices; and cause a selected one of the two or more devices to be disconnected when a graphic object corresponding to the selected one device is selected.

In an embodiment of the present disclosure, the controller is further configured to select the two or more devices from the plurality of devices for the stored set information according to a drag trace received via the touchscreen, wherein the drag trace forms a loop intersecting each of the two or more devices in the displayed image.

In an embodiment of the present disclosure, the controller is further configured to cause the set information to be stored when a preset period expires or when a connection state of one of the two or more devices is changed.

In an embodiment of the present disclosure, the controller is further configured to cause the touchscreen to display a control interface for each of the two or more devices, wherein the control interfaces are different based on a size of the corresponding device in the displayed image.

In an embodiment of the present disclosure, wherein the size of the corresponding device in the displayed image is changed according to zooming-in or zooming-out of the image or according to movement of the mobile terminal within the specific indoor area.

In an embodiment of the present disclosure, the controller is further configured to change a displayed control interface to have a higher granularity of control of a corresponding device as a size of the corresponding device in the displayed image is increased.

In an embodiment of the present disclosure, the controller is further configured to: cause the touchscreen to display a graphic object related to an operational state of a selected device of the two or more devices in response to a selection of the selected device in the displayed image; and control the selected device based on a touch input to the displayed graphic object.

In an embodiment of the present disclosure, the controller is further configured to cause the touchscreen to display the image sensed by the camera which is reflected effects of the operating state change of the one or more IOT device.

In an embodiment of the present disclosure, further comprising a sensor configured to detect a state in which the mobile terminal is gripped, wherein the preview image obtained by the camera or the previously stored image is displayed based on the detected state in which the mobile terminal is gripped.

In an embodiment of the present disclosure, the controller is further configured to cause the touchscreen to display another previously stored image corresponding to another indoor area when a specific object included in the previously stored image is displayed on the touchscreen and a selection input is received to the displayed specific object, wherein the displayed another previously stored image includes another plurality of devices.

In an embodiment of the present disclosure, the controller is further configured to connect one of the another plurality of devices with one of the two or more devices.

In an embodiment of the present disclosure, the controller is further configured to cause the touchscreen to display an indicator corresponding to a region of the specific object on the displayed image when the another previously stored image is stored.

In an embodiment of the present disclosure, the controller is further configured to: establish a connection with an access point via the communication unit, wherein the access point includes information related to the plurality of devices in the specific indoor area; and determine that the mobile terminal has entered the specific indoor area when the mobile terminal is connected to the access point.

To achieve these and other advantages and in accordance with the purpose of this specification, as embodied and broadly described herein, a method for controlling a mobile terminal, the method comprising: displaying a plurality set information items comprising connection state information and operational state information of a plurality of devices located in a specific indoor area, wherein each of the plurality of set information items are displayed differently based on surrounding environment information detected when each corresponding set information item was stored; and controlling one or more of the plurality of devices to be connected to each other and operate according to a selected set information item of the plurality of set information items in response to selection of the selected set information item, wherein each of the plurality of set information items corresponds to a different preset specific situational setting.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a flow chart illustrating an operational process in which different user interfaces are provided to control Internet of things (IOT) devices according to a state in which a mobile terminal is gripped, in a mobile terminal according to an embodiment of the present disclosure.

FIG. 10 is a view illustrating an example in which IOT devices are controlled through a preview image, in a mobile terminal according to an embodiment of the present disclosure.

FIGS. 14A and 14B are views illustrating examples in which operational states of a plurality of IOT devices are controlled according to a preset mode, in a mobile terminal according to an embodiment of the present disclosure.

FIG. 15 is a view illustrating an example in which a change in a surrounding environment according to an IOT device whose operational state has been changed is displayed through a preview screen, in a mobile terminal according to an embodiment of the present disclosure.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
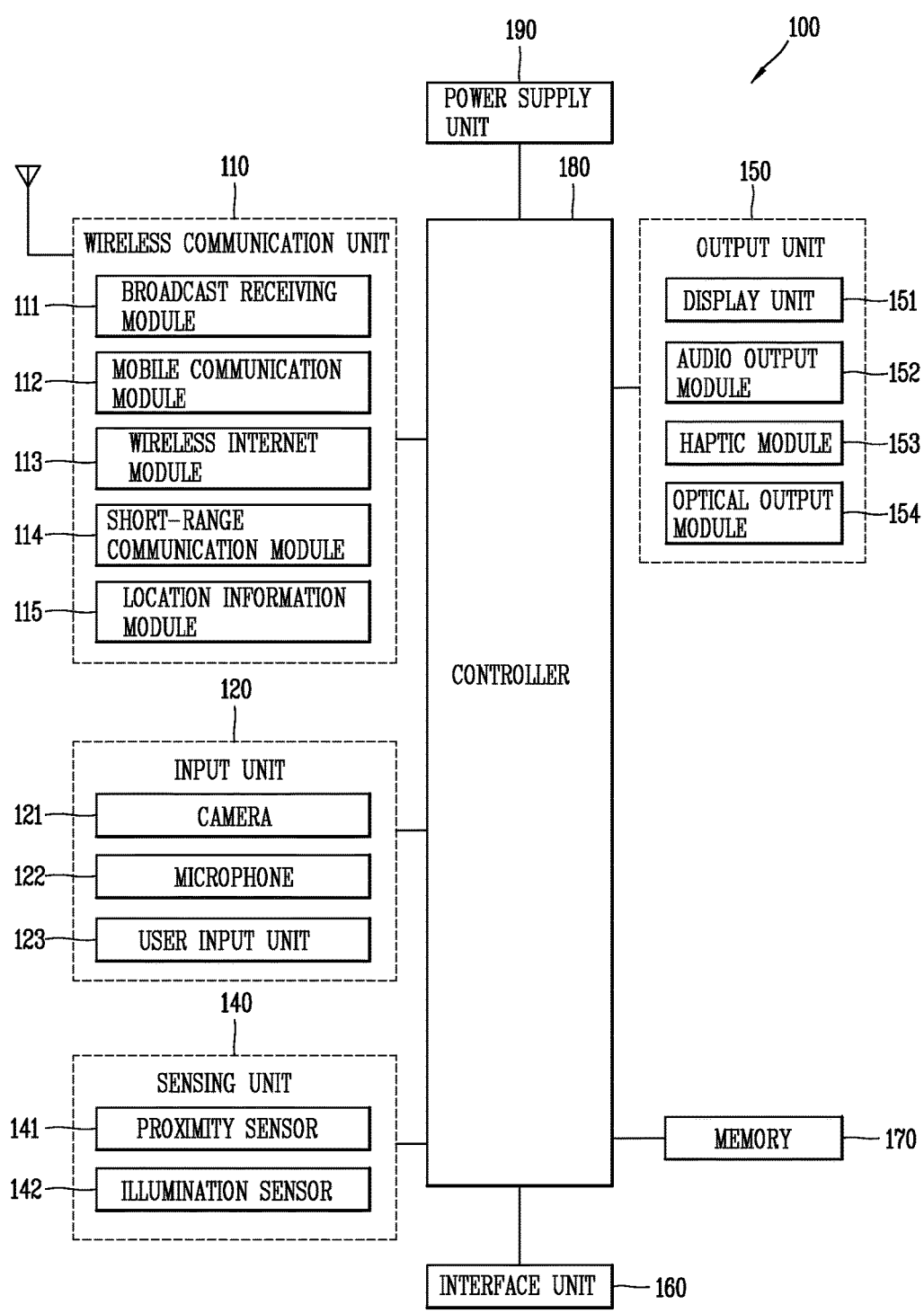
FIG. 1A is a block diagram of a mobile terminal in accordance with the present disclosure.
Figure 1B:
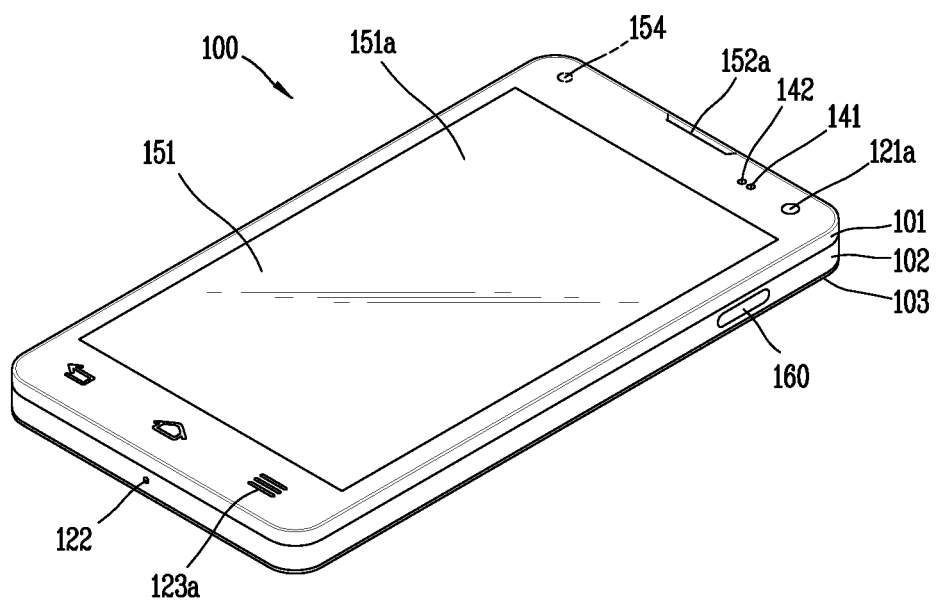
FIGS. 1B and 1C are conceptual views of one example of the mobile terminal, viewed from different directions.
Figure 1C:
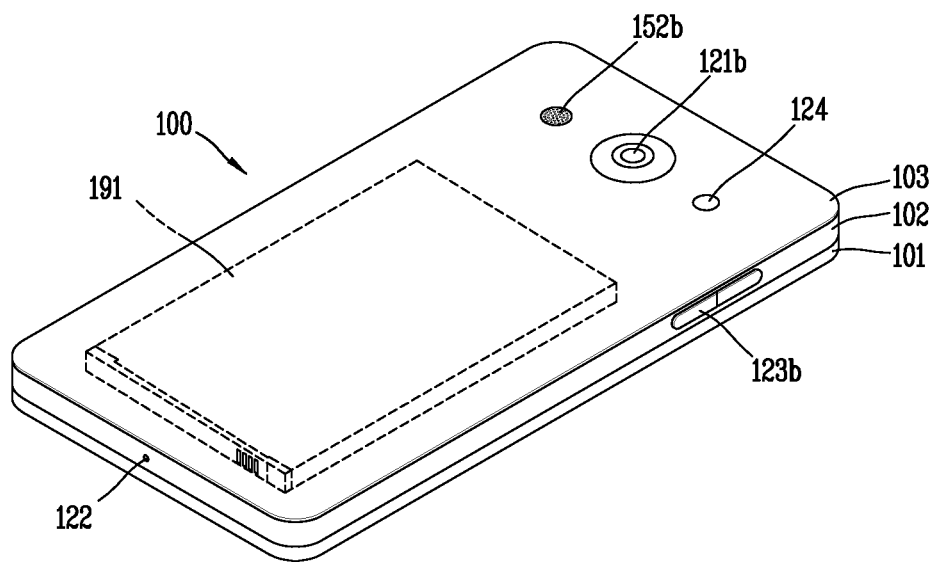

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that may be implemented in the mobile terminal 100 configured as described above will be described with reference to the accompanying drawings. It will be apparent to those skilled in the art that modifications and variations can be made without departing from the spirit and scope of the invention.

Figure 3A:
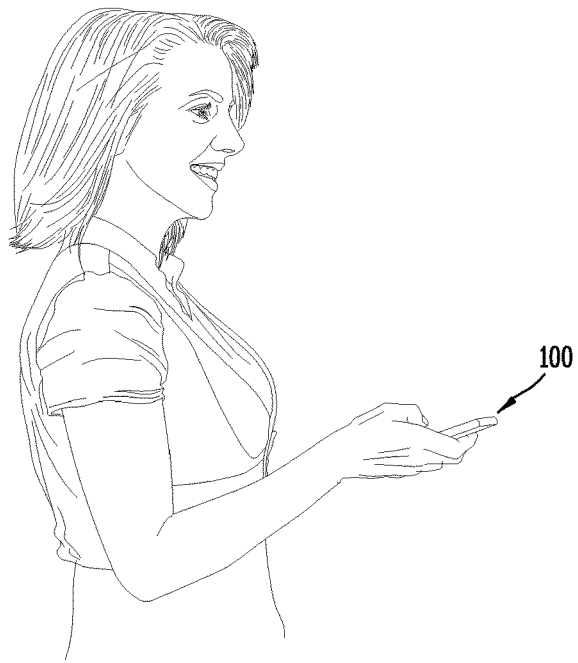
FIGS. 3A and 3B are views illustrating examples in which a mobile terminal is gripped according to an embodiment of the present disclosure.
Figure 3B:
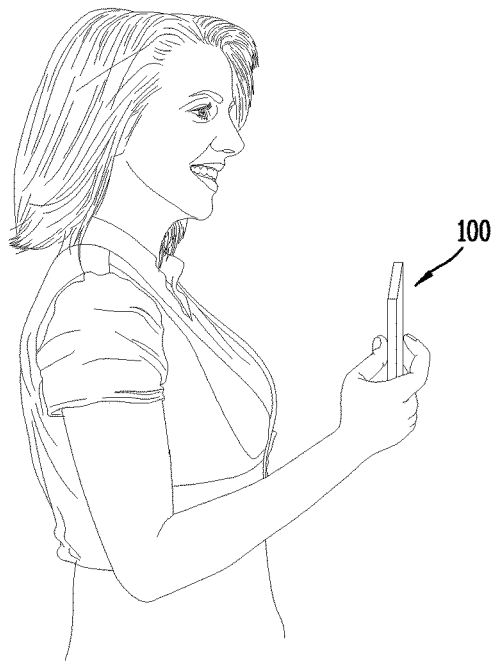

FIG. 2 is a flow chart illustrating an operational process in which different user interfaces are provided to control Internet of things (IOT) devices according to a state in which a mobile terminal 100 is gripped, in the mobile terminal 100 according to an embodiment of the present disclosure, and FIGS. 3A and 3B are views illustrating examples in which the mobile terminal 100 is gripped according to an embodiment of the present disclosure.

Referring to FIG. 2, in an embodiment of the present disclosure, when the mobile terminal 100 enters a preset indoor area, the user may select whether to perform a function of identifying and controlling IOT devices positioned in the corresponding indoor area. For example, the controller 180 may detect whether the mobile terminal has entered the preset indoor area according to whether the mobile terminal has accessed a preset access point (AP). When the user selects starting of the function of identifying and controlling the IOT devices positioned in the corresponding in door area, the controller 180 may start the operational process of FIG. 2.

First, the controller 180 may detect a state in which the mobile terminal 100 is gripped (S200). This is to recognize an intuitional behavior of a user on the basis of a state in which the user is currently gripping the mobile terminal 100, and provides an appropriate user interface according to the recognition result. For example, the controller 180 may recognize whether the mobile terminal 100 is currently in a state of being positioned in a direction perpendicular to the ground or in a state of being positioned in a direction horizontal to the ground, by using a gravity sensor. That is, when a gravity direction sensed by the gravity sensor is a direction of a front side or a rear side of the mobile terminal 100, the controller 180 may determine that the mobile terminal 100 is in a direction horizontal to the ground. Meanwhile, when the gravity direction sensed by the gravity sensor is oriented to an upper end portion or a lower end portion of the mobile terminal 100, the controller 180 may determine that the mobile terminal is currently in a direction perpendicular to the ground. Here, as for the front side or the rear side of the mobile terminal 100, with respect to the display unit 151 provided on the mobile terminal 100, the side of the mobile terminal 100 on which the display unit 151 is formed may be the front side and the side of the mobile terminal opposing the front side may be the rear side. Also, as for the upper end portion or the lower end portion of the mobile terminal 100, a portion of the mobile terminal 100 where the first audio output unit 152*a* is provided may be the upper end portion of the mobile terminal 100 and a portion of the mobile terminal 100 where the microphone 122 is formed may be the lower end portion of the mobile terminal 100.

FIGS. 3A and 3B are views illustrating examples in which the mobile terminal 100 is gripped according to an embodiment of the present disclosure.

First, as illustrated in FIG. 3A, when the user grips the mobile terminal 100 in a state in which the mobile terminal 100 is laid down, the controller 180 may detect that the mobile terminal 100 is in a state of being horizontal to the ground. In such a case, the controller 180 may recognize a user's behavior that the user intends to identify IOT devices through a previously stored indoor image, that is, a previously captured indoor image, regardless of the camera of the mobile terminal 100.

On the other hand, as illustrated in FIG. 3B, when the user grips the mobile terminal 100 in a state in which the mobile terminal 100 is erected, the controller 180 may detect that the mobile terminal is currently in a state of being perpendicular to the ground. In such a case, the controller 180 may recognize user's behavior that the user intends to identify IOT devices through an image sensed by using a second camera 121*b* installed on the rear side of the mobile terminal 100.

The controller 180 determines a gripped state of the mobile terminal 100 according to a detection result of step S200 (S202), and provides different user interfaces for identifying and controlling IOT devices according to the determination result.

First, when the mobile terminal 100 is gripped in a state of being laid down according to the determination result of step S202 as illustrated in FIG. 3A, the controller 180 may output a previously stored image corresponding to an indoor state in which the mobile terminal 100 is currently positioned, on the display unit 151 (S204). Here, as described above, the controller 180 may recognize a location in which the mobile terminal 100 is positioned on the basis of a signal received from the currently accessed AP or a connectable peripheral device, for example, IOT devices. The previously stored image may be an image previously captured by the user. In such a case, on the basis of a user selection or additional information ((for example, information regarding a location in which an image was captured) stored for each of images, the controller 180 may output an image corresponding to an indoor location at which the mobile terminal 100 is currently positioned, on the display unit 151.

Meanwhile, in a case in which the previously stored image is output on the display unit 151, the controller 180 may identify a plurality of IOT devices included in the image output on the display unit 151. Also, the controller 180 may display the plurality of identified IOT devices such that they are differentiated on the output image (S206). Also, the controller 180 may further display information regarding each of the plurality of identified IOT devices.

The controller 180 may identify the IOT devices included in the image through various methods. Here, each of the IOT devices may refer to a device that may form a network with other IOT devices, and in order to form a network with other IOT devices, each of the IOT devices may use a wireless repeater, that is, a device such as an AP, or the like.

Thus, each of the IOT devices may be connected to the AP and transmit identification information thereof to the connected AP. The AP may store the identification information received from the IOT device. When a request is received from the previously registered mobile terminal 100, the identification information may be transmitted to the previously registered mobile terminal 100. Meanwhile, when the user selects starting of the function of identifying and controlling the IOT devices positioned in the corresponding region, the mobile terminal 100 may request the identification information regarding the IOT devices from the currently connected AP, that is, the AP which has received the identification information of the IOT devices.

Meanwhile, when the pieces of the identification information of the IOT devices are received from the AP, the controller 180 may collect information regarding an external appearance of the IOT devices corresponding to the received identification information through a previously stored server or a manufacturer related to the external appearance of the IOT devices corresponding to the identification information. The controller 180 may analyze the previously stored image output on the display unit 151, and detect a region in which a device matched to the collected external appearance information. The controller 180 may identify the detected region as a region in which the IOT device corresponding to the collected external appearance information is displayed. The controller 180 may then display the detected region such that it is differentiated from other regions. When the IOT device is identified in this manner, the controller 180 may further display information related to the corresponding IOT device, in the vicinity of the identified IOT device (S206).

Meanwhile, when the mobile terminal 100 is gripped in a state in which the mobile terminal is erected according to the determination result of step S202 as illustrated in FIG. 3B, the controller 180 may activate the camera of the mobile terminal 100, for example, a sensor of the second camera 121b. The controller 180 may output an image received through the activated camera sensor on the display unit 151. In such a case, an image received from the camera sensor may be output on the display unit 151 as an image in a preview state (S212).

Meanwhile, the image in the preview state may be changed according to a direction in which the camera sensor is oriented. In a state in which the image in a preview state is output on the display unit 151, the controller 180 may analyze the preview image and detect whether an image matched to the previously collected external appearance information of the IOT device. Here, the external appearance information of the IOT device may be information collected from a previously stored server or a manufacturer of the IOT device corresponding to the identification information and may correspond to identification information of an IOT device received from an AP to which the mobile terminal 100 is currently connected.

Meanwhile, in a case in which a region in which an image matched to the collected external appearance information of the IOT device is displayed is detected from the preview image, the controller 180 may identify the detected region as a region in which the IOT device corresponding to the collected external appearance information is included in the preview image. The controller 180 may then display the detected region such that it is differentiated from other regions. When the IOT device is identified, the controller 180 may display information related to the corresponding IOT device, in the vicinity of the identified IOT device. Also, the controller 180 may further display information regarding each of the identified IOT devices, on the image (S214).

In the following descriptions, an operation mode of the mobile terminal 100 in which the mobile terminal 100 is gripped in a state of being laid down and IOT devices included in a specific indoor area are identified through a previously captured image as illustrated in FIG. 3A will be referred to as a "photo mode". Meanwhile, an operation mode of the mobile terminal 100 in which the mobile terminal 100 is gripped in an erected state and IOT devices included in a specific indoor area are identified through an image in a preview state as illustrated in FIG. 3B will be referred to as an "augmented reality (AR) mode".

In step S206 or S214, when an IOT device is identified from an image (a previously captured image or an image in a preview state) output on the display unit 151, the controller 180 may select at least one of the identified IOT devices according to a user input (S208). Also, the controller 180 may control or manage the selected at least IOT device (S210). For example, in step S208, on the basis of a user's touch input applied to the image currently output on the display unit 151, that is, applied to the previously captured image or the image in a preview state, the controller 180 may allow an operational state of a specific IOT device displayed on the output image to be controlled, or may allow a plurality of IOT devices to be connected to each other.

Here, the user's touch input may be various inputs such as a touch input applied to the display unit 151, a touch-and-drag input, and the like. Also, the controller 180 may display an image of a specific IOT device such that it is magnified or reduced on the basis of a user's touch input applied to the display unit 151, and may perform control such that different control interfaces are displayed according to sizes of images of a specific IOT device displayed on the display unit 151.

In this manner, an operational process of the mobile terminal 100 according to an embodiment of the present disclosure in which different control interfaces are displayed according to sizes of an IOT device displayed on the display unit 151 will be described in detail with reference to FIG. 5. Also, an operational process of the mobile terminal 100 according to an embodiment of the present disclosure in which a plurality of IOT devices are connected to each other according to a user's touch input applied to an image output on the display unit 151 will be described in detail with reference to FIG. 6.

Meanwhile, in the above, the case in which an IOT device positioned in a specific indoor area is identified through a previously stored image or an image in a preview state by simply using the photo mode or the AR mode has been described. However, the mobile terminal 100 according to an embodiment of the present disclosure may also provide an operation mode in which the user may select an IOT device positioned in a specific indoor area not displayed through the previously stored image or the image in a preview state, and may control an operation thereof. Here, in the photo mode or the AR mode, a specific indoor area whose interior is not displayed may be an "indoor area covered" by a closed door, and the like, for example. In such a case, the controller 180 may identify IOT devices positioned in the "covered indoor area" by using an image corresponding to the "covered indoor area", and display the area in which the identified IOT devices are included such that the area is differentiated on the image corresponding to the "covered indoor area". Also, the controller 180 may control the IOT devices positioned in the "covered indoor area" or may connect the plurality of IOT devices according to a user selection.

Meanwhile, while the photo mode or the augmented reality mode uses a previously stored image of the indoor area in which the mobile terminal 100 is currently positioned or an image in a preview state is used, displaying of an image of a "covered indoor area" uses an image of an indoor area in which the mobile terminal 100 is not currently positioned. Thus, in the following description, the operation mode of the mobile terminal 100 according to an embodiment of the present disclosure in which IOT devices are identified through an image of the "covered indoor area" will be termed a "virtual reality (VR) mode". Also, an operational process of connecting the IOT devices of the covered indoor area or the IOT devices of the indoor area in which the mobile terminal 100 is currently positioned, in the VR mode, or an operational process of controlling an operation state thereof will be described in detail with reference to FIG. 4.

Figure 4:
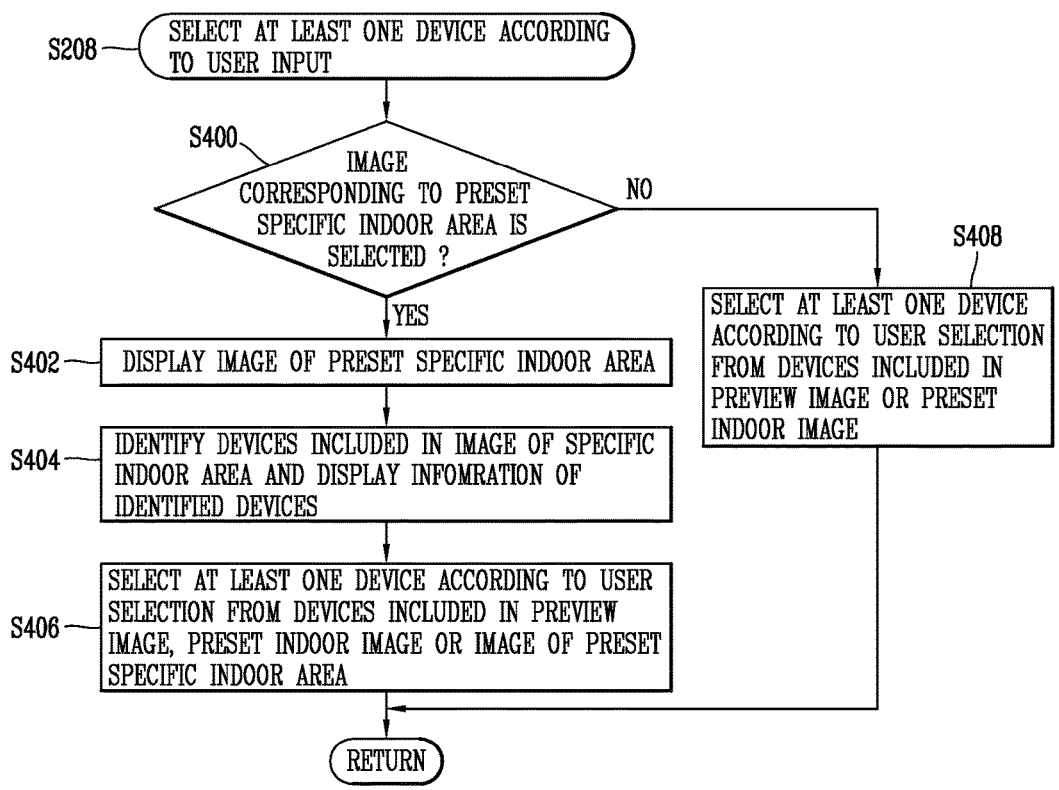
FIG. 4 is a flow chart illustrating a process in which a user interface is provided to control IOT devices positioned in specific areas whose interior is not displayed, according to a user selection, in a mobile terminal according to an embodiment of the present disclosure.

FIG. 4 is a flow chart illustrating a process in which a user interface is provided to control IOT devices positioned in specific areas whose interior is not displayed, according to a user selection, in the mobile terminal 100 according to an embodiment of the present disclosure.

Referring to FIG. 4, in a state in which the mobile terminal 100 is operated in the photo mode or in the AR mode in step S208, the controller 180 of the mobile terminal 100 may detect a user's touch input applied to an image currently output on the display unit 151. Here, the controller 180 may detect whether the user's touch input has been applied to a region in which an image corresponding to a preset specific region, that is, the "covered indoor area", is displayed (S400).

In a case in which the user's touch input has not been applied to the region in which the image corresponding to the "covered indoor area" is displayed according to the detection result in step S400, the user 180 may select at least one of the IOT devices included in the image output on the display unit 151 through the photo mode or the AR mode (S408). The controller 180 may change an operational state of the selected IOT device or may connect the plurality of IOT devices.

Meanwhile, when the user's touch input has been applied to the region in which the image corresponding to the "covered indoor area" is displayed according to the detection result in step S400, the controller 180 may output the image of the specific indoor area corresponding to the specific area, that is, the image of the "covered indoor area", on the display unit 151.

In such a case, the image corresponding to the "covered indoor area may be an image which has been previously stored. Also, when there is a use selection, the controller 180 may output the image corresponding to the "covered indoor area" on the display unit 151. Here, the user selection may be determined according to a user's touch input to a specific area of a previously stored image (image output on the display unit 151 in the photo mode) or an image in a preview state (image output on the display unit 151 in the AR mode).

That is, when the image of the "covered indoor area" is stored or captured, the user may set the specific area of the previously stored image (image output in the photo mode) or the image in the preview state (image output in the AR mode) such that it corresponds to the image of the "covered indoor area". Here, the specific area may be an area in which an image of an object corresponding to the "covered indoor area" is displayed in the previously stored image or the image in the preview state, like an object corresponding to the "covered indoor area", for example, a door of the "covered indoor area".

When a user's touch input is sensed in the specific area, the controller may determine that the user has selected to operate the mobile terminal in an operation mode in which IOT devices are identified, that is, in the "VR mode", by using the image of the "covered indoor area". When the specific area is selected by the user, the controller 180 may output the image corresponding to the "covered indoor area" on the display unit 151 (S402).

When the image corresponding to the "covered indoor area" is output on the display unit 151, IOT devices included in the image corresponding to the "covered indoor area" may be identified. Here, the controller 180 may further display information regarding the IOT devices in the vicinity of the identified IOT devices (S404).

Here, the IOT devices may be identified in a process similar to a process of identifying IOT devices included in a previously captured indoor image in the photo mode. That is, the mobile terminal 100 may receive identification information of the IOT devices positioned in the "covered indoor area" from an AP of the "covered indoor area", and may collect appearance information of each of the IOT devices from the received identification information of each of the IOT devices. On the basis of the collected appearance information, the IOT devices positioned in the "covered indoor area" may be identified and displayed such that the identified IOT devices are differentiated from each other.

Meanwhile, when the IOT devices positioned in the "covered indoor area" are identified, the controller 180 may select at least one of the identified IOT devices on the basis of a touch input applied to the image of the "covered indoor area". Or, the controller may select at least one of the IOT devices positioned in the "covered indoor area" and at least one of the IOT devices included in an image (a previously stored indoor image or an image in a preview state) displayed in a state in which the mobile terminal operates in the photo mode or the AR mode, on the basis of a user's touch input (S406). The selected IOT devices may be controlled in an operation state thereof or may be connected to each other in step S210.

Meanwhile, the controller 180 of the mobile terminal 100 may identify an IOT device included in an image output in the photo mode or in the AR mode, and distinguishably display an area of the image corresponding to the identified IOT device. In this state, in a case in which the user zooms in the region in which the specific IOT device is displayed or in a case in which the user moves to a point adjacent to a location where the specific IOT device is position, the image of the specific IOT device may be displayed to be greater on the output image.

Or, conversely, in a case in which the user zooms out the region in which the specific IOT device is displayed or in a case in which the user moves to a point away from the location in which the specific IOT device is positioned, the image of the specific IOT device may be displayed to be smaller on the output image. In such a case, the controller 180 of the mobile terminal 100 according to an exemplary embodiment of the present disclosure may provide different control interfaces to the user according to sizes of the image of the specific IOT device displayed on the output image.

In such a case, the different control interfaces may be interfaces allowing different functions to be controlled or allowing the same function to be controlled in different manners. For example, in a case in which an image of an IOT device displayed on the display unit 151 has a size smaller than a predetermined size, the controller 180 may display a control interface screen for controlling only a specific function of the corresponding IOT device or a control interface screen for the user to select a specific level or a numeral value of the corresponding IOT device according to a preset numerical value or level on the display unit 151. Meanwhile, in a case in which the displayed image of the IOT device has a size greater than the predetermined size, the controller 180 may display a control interface screen for controlling more functions of the corresponding IOT device or a control interface screen for more minutely manipulating the corresponding IOT device on the display unit 151. An operational state of the corresponding IOT device may be controlled according to a user input sensed through the control interface screen.

Figure 5:
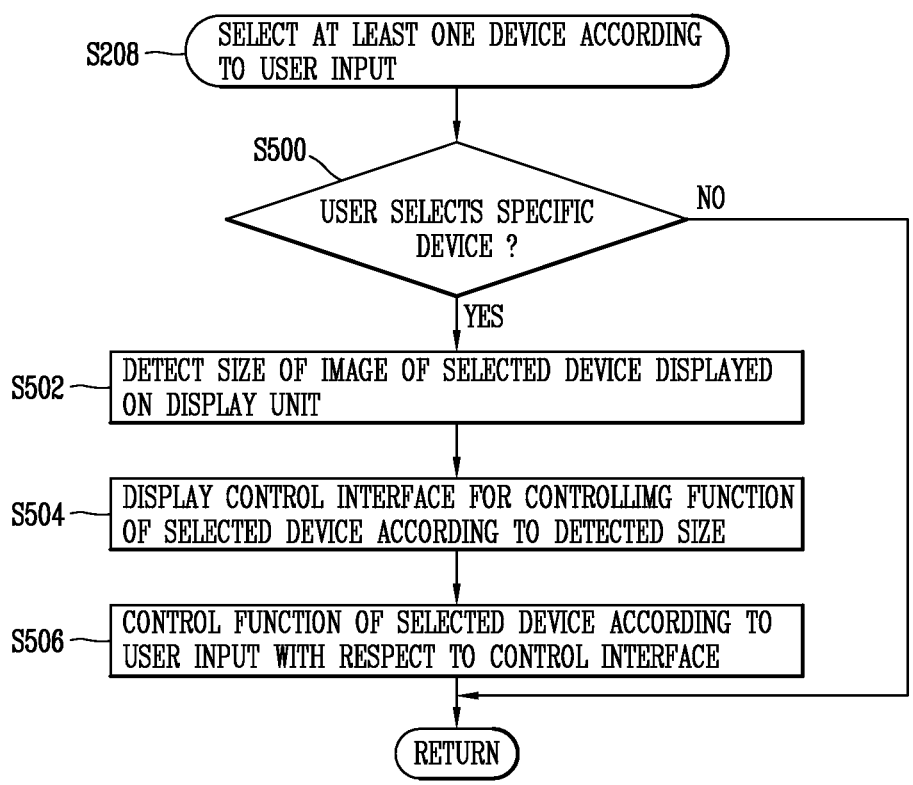
FIG. 5 is a flow chart illustrating a process in which different control interfaces are provided according to sizes of specific IOT device images displayed on a display unit, in a mobile terminal according to an embodiment of the present disclosure.

FIG. 5 illustrates an operational process in which different control interfaces are provided according to sizes of an image of an IOT device in the mobile terminal 100 according to an embodiment of the present disclosure.

Referring to FIG. 5, the controller 180 of the mobile terminal according to an embodiment of the present disclosure may detect whether an IOT device to be controlled in an operational state is selected by the user, from among the IOT devices displayed on the image output on the display unit 151 (previously captured image (photo mode) or image in a preview state (AR mode)) (S500). For example, in step S500, the controller 180 may detect whether the user has selected an IOT device on the basis of whether there is a region in which user's touch input has been sensed among regions of the display unit 151 on which IOT device images are displayed.

According to the detection result of step S500, when it is detected that there is an IOT device selected by the user, the controller 180 may detect a size of an area in which an image of the selected IOT device on the display unit 151. Then, the controller 180 may detect a size of the image of the selected IOT device from the display region of the display unit 151 (S502).

For example, when the user zooms in a previously stored image (image output on the display unit 151 in the photo mode or the VR mode) or when the user moves to a location adjacent to the selected IOT device in a state in which the image in a preview state (AR mode) is displayed, the image of the selected IOT device may be displayed to be greater on the display unit 151. Meanwhile, when the user zooms out the previously stored image (image displayed on the display unit 151 in the photo mode or the VR mode) or when the user moves to a location away from the selected IOT device, the image of the selected IOT device may be reduced on the display unit 151.

In such a case, the controller 180 may calculate a ratio of the image of the selected IOT device to the region of the display unit 151 in which image information is displayed. The controller 180 may detect a size of the image of the selected IOT device currently displayed on the display unit 151 according to the calculated ratio.

The controller 180 may then display any one control interface screen corresponding to the detected size, among a plurality of control interface screens for controlling a function of the selected IOT device, on the display unit 151 (S504). Here, as a size of the image of the detected IOT device is greater, it may correspond to a control interface screen for controlling more functions or a control interface screen for minutely manipulating the corresponding IOT device. Thus, as the size of the image of the IOT device displayed on the display unit 151 is greater, the control interface screen including more functions or allowing the user to perform minute manipulation may be displayed on the display unit 151.

The controller 180 may control the selected IOT device according to a user input applied to the displayed control interface screen (S506). An example in which different control interfaces are provided according to sizes of an image of an IOT device displayed on the display unit 151 will be described with reference to FIGS. 16A and 16B hereinafter.

Meanwhile, in the above, the example in which the user selects an IOT device to be controlled and different control interfaces are provided according to a size of the selected IOT device has been described, but alternatively, a function related to controlling of the corresponding IOT device may be activated according to a size of the IOT device. In such a case, the controller 180 may activate a function of controlling the corresponding IOT device according to a result of detecting a size of the image of the IOT device displayed on the display unit 151. In such a case, in order to display a state in which the control function is activated, the controller 180 may display a preset control interface screen on the display unit 151.

Figure 6:
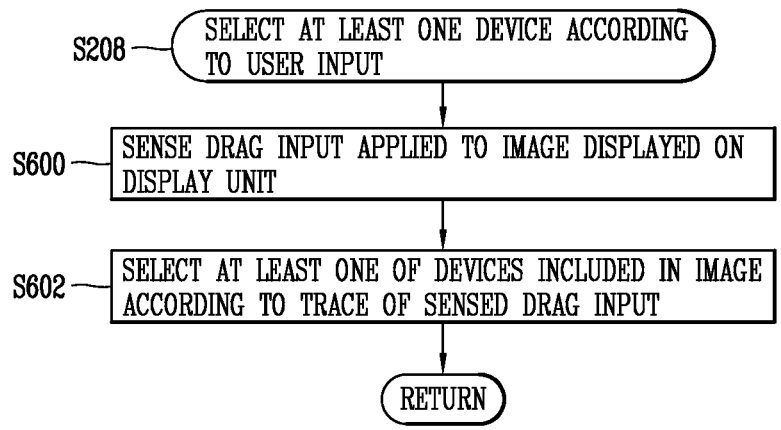
FIG. 6 is a flow chart illustrating an operational process in which one or more IOT devices are connected on the basis of a touch input applied to an image displayed on a display unit, in a mobile terminal according to an embodiment of the present disclosure.

Meanwhile, as described above, a plurality of IOT devices may be connected to each other on the basis of a user's touch input applied to an image (previously stored image output during an operation in the photo mode or the VR mode) output on the display unit 151. FIG. 6 is a flow chart illustrating an operational process of the mobile terminal 100 according to an embodiment of the present disclosure.

Referring to FIG. 6, the controller 180 of the mobile terminal according to an embodiment of the present invention may detect (or sense) a user's touch-and-drag input applied to an image output on the display unit 151 (S600). For example, such a touch-and-drag input may be applied to a region in which a second IOT device is displayed from a region in which a first IOT device is displayed on the output image.

In such a case, the controller 180 may select at least one of IOT devices included in the output image according to a trace of the applied drag input (S602). That is, when the drag input is applied in the display unit 151 region in which a specific IOT device is displayed, the controller 180 may detect that the corresponding IOT device is selected by the user.

When one IOT device is selected by the drag input, the controller 180 may display a screen (for example, a control interface screen) for controlling an operational state of the selected IOT device on the display unit 151 in step S210 of FIG. 2

Meanwhile, when a plurality of IOT devices are selected by the drag input, the controller 180 may determine that a plurality of IOT devices have been selected by the user. The controller 180 may cause the plurality of IOT devices to establish a network so as to be connected in step S210. In such a case, the controller 180 may display the state in which the plurality of IOT devices are connected on the display unit 151 by using a linear graphic object connecting images corresponding to the plurality of IOT devices.

Meanwhile, when an operational state of the specific IOT device is changed in step S210 of FIG. 2, the controller 180 of the mobile terminal 100 according to an embodiment of the present disclosure may provide a function enabling a user to previously check a surrounding environment of the IOT device varied according to the changed operational state. To this end, the controller 180 may display a surrounding environment of the IOT device varied according to the changed operational state in one region of the display unit 151. Here, the function of displaying the varied surrounding environment of the IOT device will be referred to as a preview function, and the one region on the display unit 151 in which the varied surrounding environment of the IOT device is displayed will be referred to as a preview region.

The preview function may be performed differently according to types and characteristics of an IOT device whose operational stage has been changed by the user. For example, when the IOT device whose operational state has been changed is a lighting device, the controller 180 may display an image of an indoor area darkened or brightened according to changed illumination in the preview region. Also, when the IOT device whose operational state is changed is a TV, the controller 180 may display an image of the TV outputting image information which is darkened and brightened according to changed brightness in the preview region.

Meanwhile, the preview region may be formed only in a portion of the display unit 151. Thus, the user may compare the image displayed in the preview region and an image displayed in other region of the display unit 151 and previously check an influence according to the change in the operational state.

Figure 7:
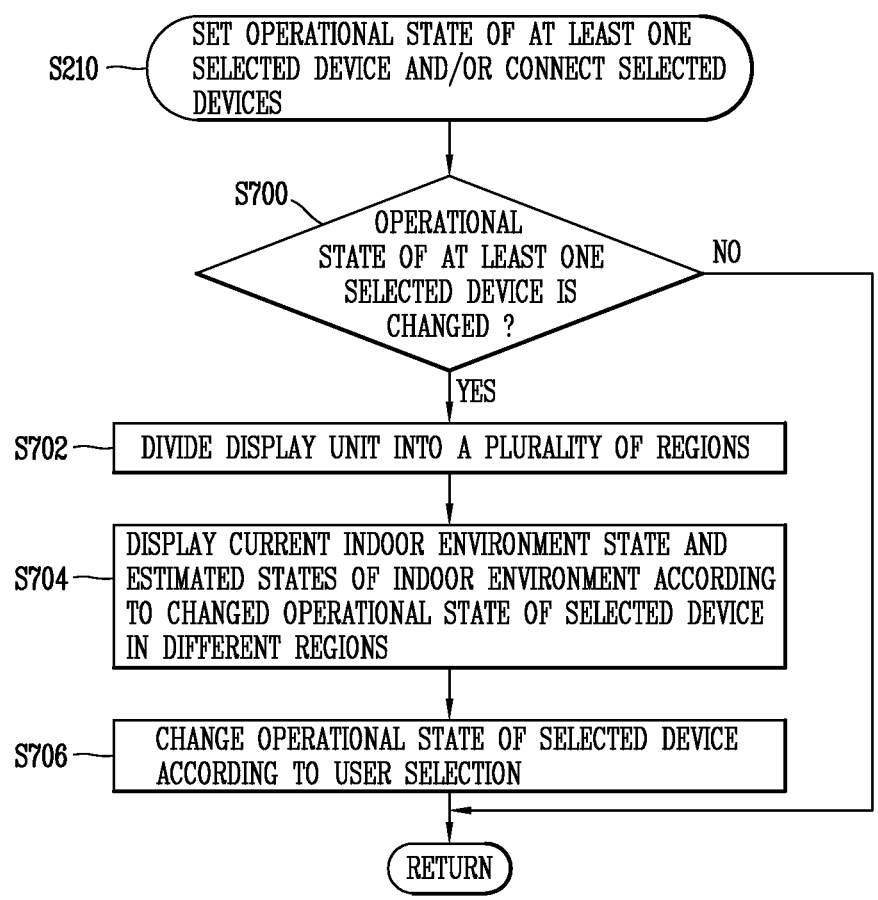
FIG. 7 is a flow chart illustrating an operational process in which an image estimated according to a change in an operational state of a specific IOT device is displayed, in a mobile terminal according to an embodiment of the present disclosure.

FIG. 7 is a flow chart illustrating an operational process in which an image estimated according to a change in an operational state of a specific IOT device is displayed, in the mobile terminal 100 according to an embodiment of the present disclosure.

Referring to FIG. 7, the controller 180 of the mobile terminal according to an embodiment of the present disclosure may detect whether an operational state of a specific IOT device has been changed according to a user selection in step S210 of FIG. 2 (S700).

Here, the specific IOT device may be an IOT device previously set to display an estimated image according to the preview function. For example, such a specific IOT device may be an IOT device affecting illumination of an indoor environment, such as, a lighting device, or a curtain opening and closing device capable of adjusting an amount of light transmitted through a window.

Meanwhile, even in a case in which operational states of IOT devices, other than the IOT devices affecting illumination of an indoor area, are changed, the preview function may also be performed. For example, even when volume setting of an IOT device related to outputting of an audio signal is changed, the preview function may be performed. In this case, however, the preview function may be replaced with a function of outputting a preset audio signal according to a changed volume, rather than the function of displaying an image of an indoor area estimated to be changed. Thus, the preview function may be differently performed according to type and characteristics of an IOT device whose operational state has been changed. However, hereinafter, for the purposes of description, a case in which an image of an estimated indoor environment state is displayed according to a change in an operational state of a specific IOT device affecting illumination will be described as an example.

In a case in which an operational state of a specific IOT device which is able to execute a preview function is changed according to a detection result in step S700, the controller 180 may divide the display unit 151 into a plurality of regions (S702). The controller 180 may then display an image corresponding to the current indoor environmental state in a first region among the plurality of regions, and may display an image of an indoor environment estimated according to a change in the operational state of the IOT device in a second region among the plurality of regions (S704). Here, the first region and the second region may be different regions.

Meanwhile, in step S704, the image corresponding to the "current indoor environment state" may be varied according to an operation mode based on a state in which the mobile terminal 100 is currently gripped. For example, in a case in which an operation mode of the mobile terminal 100 is the 'AR mode", the controller 180 may display an image received from a camera sensor, as an image corresponding to the "current indoor environment state" on the display unit 151. However, when the operation mode of the mobile terminal 100 is a photo mode, the controller 180 may correct an image of a previously captured specific indoor area according to an existing set value of each of the specific IOT devices and current time, and display the corrected image as an "image corresponding to the current indoor environment state" on the display unit 151.

The user selects whether to change an operational state of the IOT device according to the currently set operational state. When the user selects to change the operational state, the controller 180 may change the operational state of the currently selected IOT device (S706).

In the above, it is described that the preview function is performed according to a change in an operational state of the specific IOT device according to a user selection, but the controller 180 of the mobile terminal 100 according to an embodiment of the present disclosure may The controller 180 of the mobile terminal 100 according to an embodiment of the present disclosure may display a preset recommendation value on the basis of the current indoor environment state and the current time. In this case, when a user applies an input to the displayed recommendation value, the controller 180 may change an operational state of the corresponding IOT device.

Meanwhile, in the above description, at least one IOT device included in a specific indoor area is identified and controlled through any one mobile terminal 100. However, in addition, the mobile terminal 100 according to an embodiment of the present disclosure may be granted a right to control already identified IOT devices by another mobile terminal 100. In such a case, the mobile terminal first identifies IOT devices and has a right to control the identified IOT devices will be referred to as a first mobile terminal and the mobile terminal granted a right to control at least one of the identified IOT devices will be referred to as a second mobile terminal.

Figure 8:
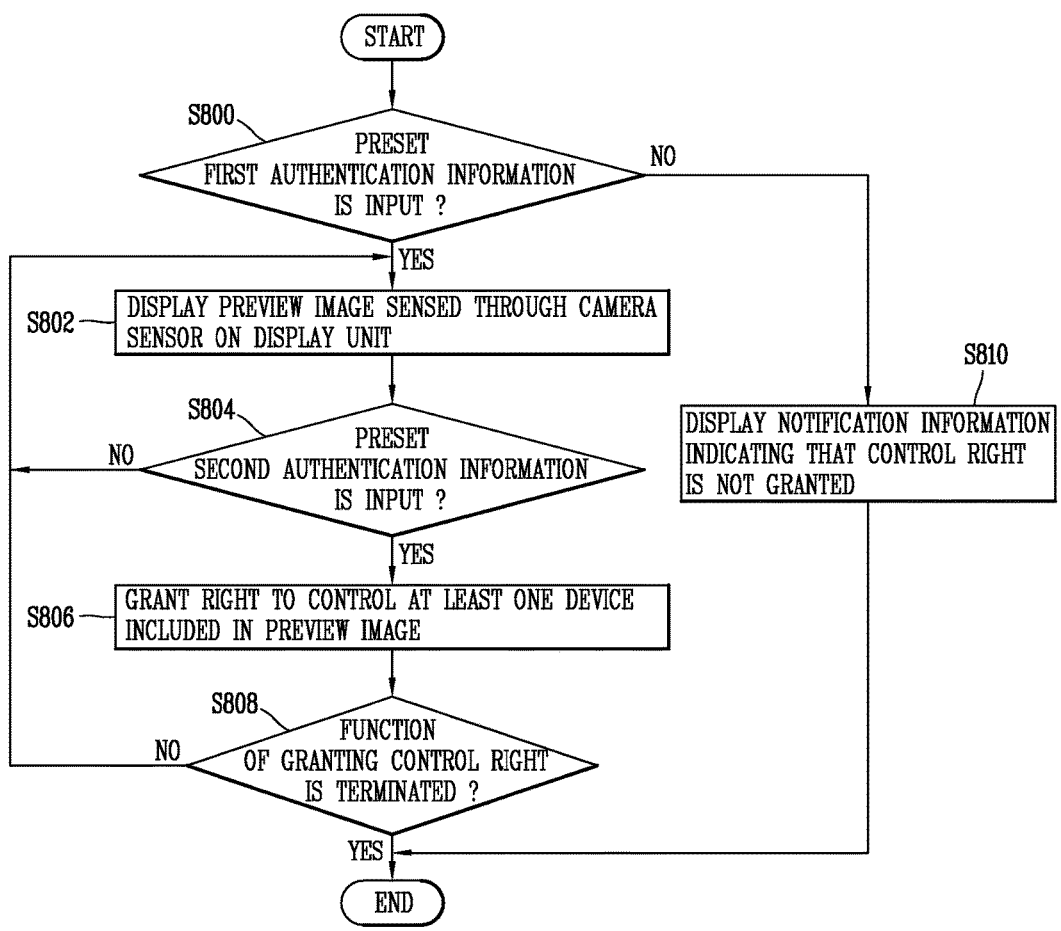
FIG. 8 is a flow chart illustrating an operational process in which a right to control IOT devices is individually granted to a different mobile terminal, in a mobile terminal according to an embodiment of the present disclosure.

FIG. 8 is a flow chart illustrating an operational process when a mobile terminal according to an embodiment of the present disclosure is a second mobile terminal.

Referring to FIG. 8, when the mobile terminal according to an embodiment of the present disclosure, that is, the second mobile terminal, enters a specific indoor area, the controller 180 of the second mobile terminal may be connected to an AP located in the area. In this case, the controller 180 may sense whether the user selects a function of identifying and controlling IOT devices positioned in the specific indoor area. When the function of identifying and controlling the IOT devices is selected, the mobile terminal may be confirmed by the AP whether it is a previously registered mobile terminal. Here, the previously registered mobile terminal may refer to a mobile terminal, that is, a first mobile terminal, previously set to control and manage IOT devices of the indoor area in which the second mobile terminal is currently positioned.

According to the confirmation result, when the mobile terminal is not a previously registered mobile terminal (first mobile terminal), the controller 180 may display notification information to inform the user that the mobile terminal is not a previously registered mobile terminal. The controller 180 may determine whether a control right related to IOT devices of the indoor area in which the mobile terminal is currently positioned may be granted. For example, whether a control right related to the IOT devices is to be granted may be determined according to whether preset authentication information has been input (S800). Also, here, the preset authentication information, that is, first authentication information, may be user authentication information of a previously registered mobile terminal, that is the first mobile terminal. Here, the preset authentication information may be information previously stored in the AP currently connected to the second mobile terminal.

Meanwhile, in step S800, when the authentication information input through the second mobile terminal does not match authentication information previously stored in the AP, the controller 180 of the second mobile terminal may display that the authentication information does not match. Also, the controller 180 may display notification information indicating that a control right is not granted on the display unit 151 of the second mobile terminal (S810).

Meanwhile, in step S800, when the authentication information input through the second mobile terminal matches the authentication information previously stored in the AP, the controller 180 of the second mobile terminal may display that the authentication information matches. The controller 180 may activate a camera sensor, for example, the second camera 121b, of the second mobile terminal and output an image in a preview state received from the second camera 121b on the display unit 151 of the second mobile terminal on the display unit 151 of the second mobile terminal (S802). The controller 180 of the second mobile terminal may sense whether preset second authentication information is input (S804).

Here, the second authentication information may be information for determining an IOT device that may be controlled through the second mobile terminal, apart from the control right granted according to whether the first authentication information input in step S800 is matched. That is, when an IOT device is included in the image currently output in a preview state, the controller 180 may identify the IOT device. In a state in which the image of the identified IOT device is displayed on the display unit 151 of the second mobile terminal, when the preset second authentication information is input, the second mobile terminal may be granted a right to control the identified IOT device according to a matching result.

Meanwhile, the second authentication information may be user authentication information of the first mobile terminal. Here, the first authentication information and the second authentication information may be the same or different. The second authentication information may be information stored in the AP, like the first authentication information.

Meanwhile, for example, the first authentication information may be fingerprint information of a user of the first mobile terminal, and the second authentication information may be a picture of a face of the user of the first mobile terminal. In this case, the right to control the IOT devices may be granted through recognition of the fingerprint information. Individual selection of IOT devices that can be controlled through the second mobile terminal may be determined according to a result of recognizing a face image included in an image received from the front camera (first camera 121a) of the second mobile terminal.

In this case, the user of the first mobile terminal, who is holding the second mobile terminal, may recognize a fingerprint and grant a right to control the second mobile terminal. Thereafter, in a state in which an image of a specific IOT device is displayed on the display unit 151 of the second mobile terminal, the user may allow his or her face to be imaged by the front camera, that is, the first camera 121a of the second mobile terminal (for example, when the user grips the second mobile terminal in a state of being erected). Accordingly, a control right to control the specific IOT device by the second mobile terminal may be granted.

Meanwhile, even though the control right to control the specific IOT device is granted, if an IOT device is not desired to be controlled through the second mobile terminal, the user of the first mobile terminal may not allow his or her face to be imaged by the second mobile terminal (for example, when the user grips the second mobile terminal in a state of being laid down), and accordingly, the corresponding IOT device may not be selected as a device that can be controlled by the second mobile terminal.

Thus, according to the sensing result in step S804, when the preset second authentication information is not input or input authentication information does not match the second authentication information previously stored in the AP, the controller 180 of the second mobile terminal may perform step S802 without granting a right to control the IOT device currently displayed on the display unit 151. In this case, the image in a preview state received from the second camera 121b may continue to be output on the display unit 151 of the second mobile terminal.

Meanwhile, when the input authentication information matches the second authentication information previously stored in the AP according to the detection result in step S804, the controller 180 of the second mobile terminal may detect that a right to control an IOT device currently displayed on the display unit 151 has been granted (S806). In this case, the controller 180 may display notification information indicating that the corresponding IOT device can be controlled, through the display unit 151 of the second mobile terminal. Also, the controller 180 of the second mobile terminal may detect whether the function of granting the right to control the IOT device has been terminated (S808). Also, the controller 180 of the second mobile terminal may repeatedly perform steps S802 to S808 according to a detection result in step S808.

Meanwhile, in the above, the operational process in which the mobile terminal 100 according to an embodiment of the present disclosure identifies and controls the IOT devices positioned in the indoor area through a previously stored image of an indoor area or through a preview image sensed through the camera has been described with reference to the flowing charts.

Hereinafter, examples in which the mobile terminal 100 according to an embodiment of the present disclosure identifies the IOT devices positioned in the indoor area and controls the identified IOT devices, through a previously stored image of an indoor area or through a preview image sensed through the camera will be described with reference to the drawings.

Figure 9A:
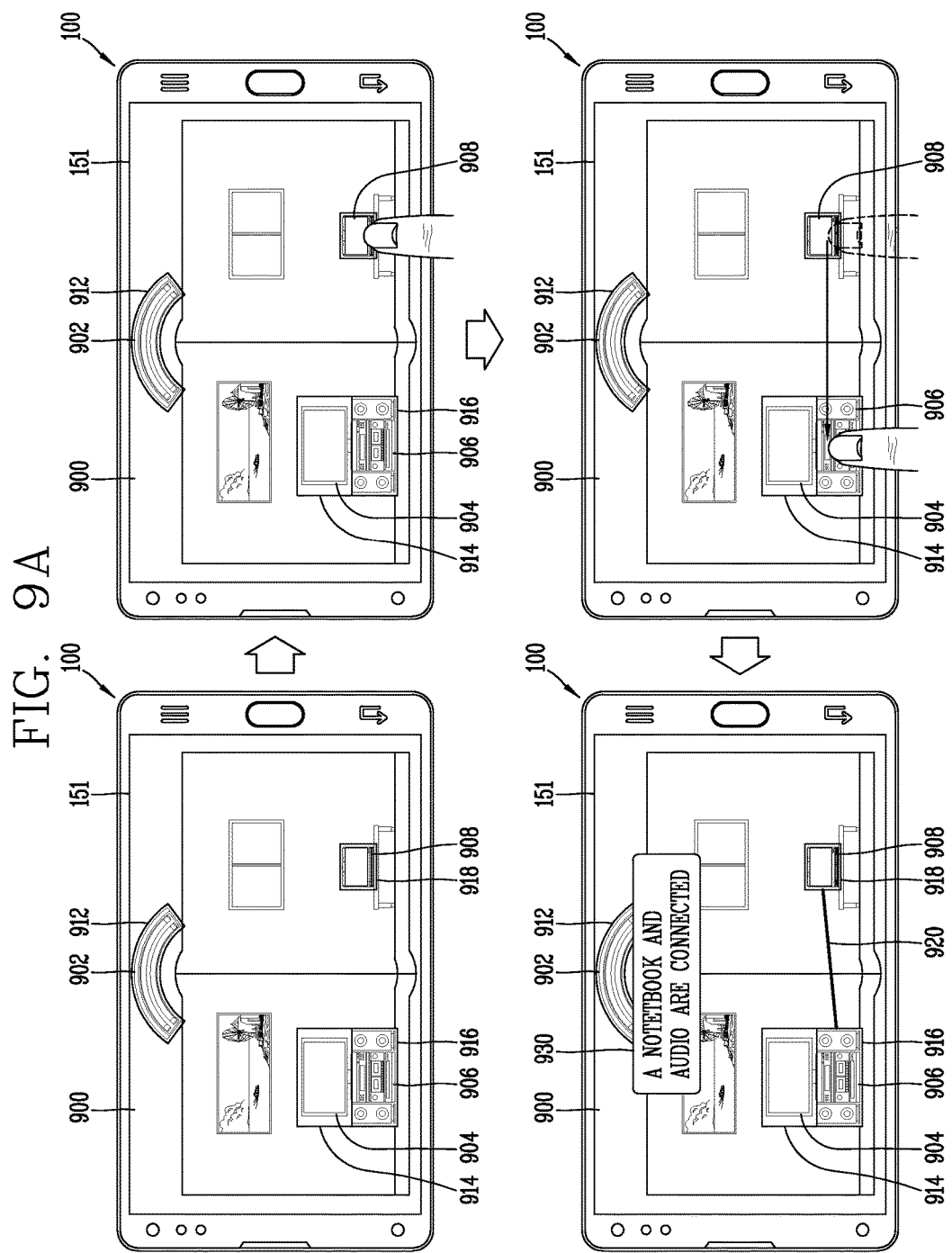
FIGS. 9A and 9B are views illustrating examples in which a mobile terminal according to an embodiment of the present disclosure controls IOT devices using a previously captured image.
Figure 9B:
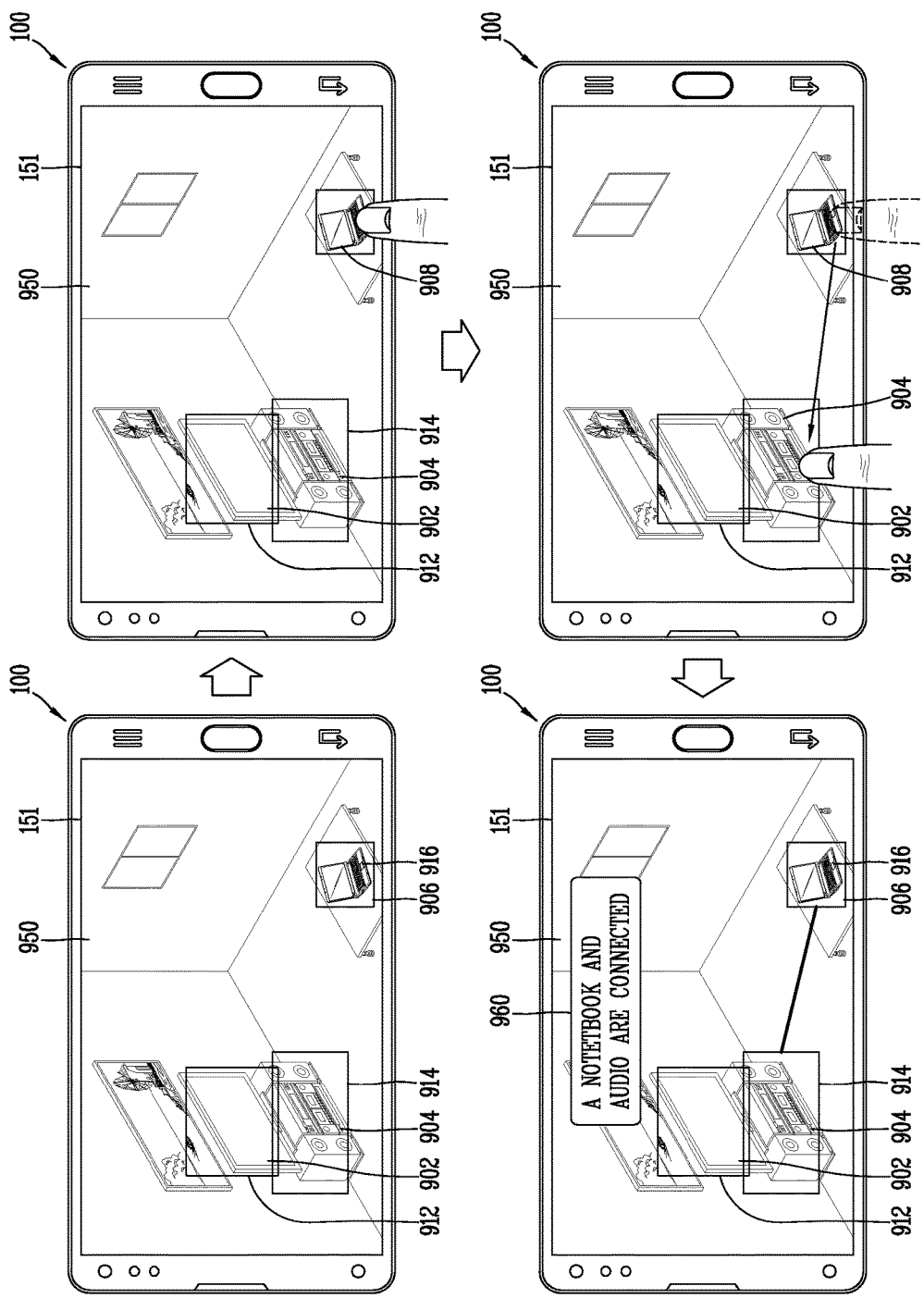

FIGS. 9A and 9B are views illustrating examples in which the mobile terminal 100 according to an embodiment of the present disclosure controls IOT devices using a previously captured image.

The controller 180 of the mobile terminal according to an embodiment of the present disclosure may display IOT devices included in a specific indoor area by using an image connecting different screens such that different sides of at least two specific indoor areas are displayed on a single plane, rather than directly using an image obtained by imaging a specific indoor area.

FIG. 9A illustrates an example in which IOT devices positioned in the specific indoor area are managed and controlled by using an image synthesized by connecting images obtained by capturing sides of two different specific indoor areas, and here, a case in which lighting 902, a TV 904, a stereo system 906, and a notebook computer 908 are present as IOT devices positioned in the specific indoor area is assumed.

First, the first drawing of FIG. 9A illustrates an example of an operational state, for example, an operational state of a photo mode, in which the synthesized image 900 of a specific indoor area is output on the display unit 151 of the mobile terminal according to an embodiment of the present disclosure. For example, when the user grips the mobile terminal 100 in a laid-down state, the controller 180 of the mobile terminal 100 according to an embodiment of the present disclosure may output the synthesized image 900 of the specific indoor area on the display unit 151 as illustrated in the first drawing of FIG. 9A.

The IOT devices 902, 904, 906, and 908 positioned in the specific indoor area are identified from the output image 900 and regions on the output image 900 in which images corresponding to the identified IOT devices 902, 904, 906, and 908 are displayed may be displayed to be distinguished. Thus, on the image 900 of the specific indoor area, regions corresponding to the images of the lighting 902, the TV 904, the stereo system 906, and the notebook computer 908 may be displayed as graphic objects 912, 914, 916, and 918 in the form of outlines, respectively, whereby identifying of the lighting 902, the TV 904, the stereo system 906, and the notebook computer 908 may be displayed.

In this state, when a user's touch is applied to the image 900 of the specific indoor area, the controller 180 may control at least one of the identified IOT devices. That is, as illustrated in the second drawing of FIG. 9A, when the user touches a region of the display unit 151 in which the image corresponding to the notebook computer 908 as the identified IOT device is displayed, the controller 180 may detect that the notebook computer 908 is selected by the user.

In the state illustrated in the second drawing of FIG. 9A, when the user applies a drag input dragged to the region of the display unit 151 in which the image corresponding to the stereo system 906 is displayed as illustrated in the third drawing of FIG. 9A, the controller 180 may detect that the stereo system 906 is selected by the user, following the notebook computer 908. In addition, the controller 180 may determine that the user selects connection of the notebook computer 908 and the stereo system 906 according to the drag input.

Then, the controller 180 may control the notebook computer 908 and the stereo system 906 to establish a network in which the notebook computer 908 and the stereo system 906 are connected to each other. Accordingly, the notebook computer 908 and the stereo system 906 may be connected to each other and share information. Thus, an stereo system signal output from the notebook computer 908 may be output through the stereo system 906.

In this manner, when the plurality of IOT devices are connected through the image 900 of the specific indoor area, the controller 180 may display the connection state of the IOT devices on the display unit 151. That is, as illustrated in the fourth drawing of FIG. 9A, the controller 180 may display a graphic object 920 connecting the images of the connected IOT devices, that is, the image of the notebook computer 908 and the image of the stereo system 906, and accordingly, the user may visually recognize that the notebook computer 908 and the stereo system 906 are connected.

Meanwhile, in FIG. 9A, the example in which the controller 180 of the mobile terminal 100 according to an embodiment of the present disclosure uses the image connecting different sides of at least two specific indoor areas is described, but an image obtained by capturing a specific indoor area may also be immediately used. FIG. 9B illustrates an example thereof.

First, referring to FIG. 9B, the first drawing of FIG. 9B illustrates an example of a photo mode operational state in which a previously captured image 950 of a specific indoor area is output on the display unit 151 of the mobile terminal 100 according to an embodiment of the present disclosure.

In this case, the controller 180 may identify the IOT devices 904, 906, and 908 positioned in the specific indoor area from the output image 950 and distinguishably display regions on the output image 950 in which images corresponding to the identified IOT devices 904, 906, and 908 are displayed. Thus, on the previously captured image 950 of the specific indoor area, regions corresponding to the images of the TV 904, the stereo system 906, and the notebook computer 908 may be displayed as graphic objects 912, 914, and 916 in the form of outlines, respectively, whereby the TV 904, the stereo system 906, and the notebook computer 908 may be displayed to be identified.

In this state, when a user's touch is applied to the previously captured image 950 of the specific indoor area, the controller 180 may control at least one of the identified IOT devices. That is, as illustrated in the second and third drawings of FIG. 9B, when the user applies a drag input from the region in which the notebook computer 908 is displayed to the region in which the stereo system 906 is displayed, the controller 180 may control the notebook computer 908 and the stereo system 906 to establish a network in which the notebook computer 908 and the stereo system 906 are connected. Accordingly, an audio signal output from the notebook computer 908 may be output through the stereo system 906.

The controller 180 may display a connection state of the IOT devices on the display unit 151. That is, as illustrated in the fourth drawing of FIG. 9B, the controller 180 may display a graphic object connecting the images of the connected IOT devices, that is, the image of the notebook computer 908 and the image of the stereo system 906, and accordingly, the user may visually recognize that the notebook computer 908 and the stereo system 906 are connected.

FIG. 10 is a view illustrating an example in which IOT devices are controlled through a preview image, in the mobile terminal 100 according to an embodiment of the present disclosure.

As illustrated in the first drawing of FIG. 10, the mobile terminal 100 according to an embodiment of the present disclosure may output an image, which is received through a rear camera, that is, the second camera 121b, of the mobile terminal 100, in a preview state on the display unit 151. For example, when the user grips the mobile terminal 100 in an erected state, the controller 180 of the mobile terminal 100 according to an embodiment of the present disclosure may directly output an image 1000 received through the camera sensor on the display unit 151 as illustrated in the first drawing of FIG. 10.

Meanwhile, as illustrated in the first drawing of FIG. 10, the controller 180 may identify and distinguishably display IOT devices on the image 1000 displayed in a preview state. For example, as illustrated in the first drawing of FIG. 10, the controller 180 may display guide lines around the identified IOT devices such that the identified IOT devices can be distinguishably displayed.

Meanwhile, in a state in which the identified IOT devices are displayed, when the user applies a touch input to a region on the display unit 151 on which any one IOT device image is displayed, the controller 180 may detect that an IOT device corresponding to the image displayed in the region to which the touch input was applied has been selected. That is, as illustrated in the first drawing of FIG. 10, when the user applies a touch input to a region of the display unit 151 in which the stereo system 906 is displayed, the controller 180 may detect that the user has selected control or management of the stereo system 906.

Meanwhile, when an image capture angle is changed by the user, the controller 180 may display an image received through the camera sensor in a preview state accordingly. That is, when the user directs the rear camera 121b of the mobile terminal toward a different area of the indoor area, a different image according to a changed image capture angle may be displayed in a preview state on the display unit 151 of the mobile terminal 100. Through an image of IOT devices included in the image received according to the changed image capture angle, the IOT devices may be identified and distinguishably displayed as illustrated in the second drawing of FIG. 10.

Meanwhile, as illustrated in the second drawing of FIG. 10, the controller 180 may detect a user's touch input applied to an IOT device image displayed on the preview image. In this case, the controller 180 may detect that controlling or management of the IOT device (stereo system 906) selected by the user in the first drawing of FIG. 10 and the IOT device (notebook computer 908) selected by the user in the second drawing of FIG. 10 are selected by the user.

For example, in a case in which a plurality of IOT devices are selected by the user, whether the selected IOT devices are to be connected to each other by establishing a network may be confirmed by the user. That is, as illustrated in the third drawing of FIG. 10, the controller 180 may display a confirmation menu 1010 on the display unit 151. Also, as illustrated in the third drawing of FIG. 10, when the user selects connection of the two selected devices, that is, the stereo system 906 and the notebook computer 908, the controller 180 may control the stereo system 906 and the notebook computer 908 to establish a network and share information.

When establishment of the network between the stereo system 906 and the notebook computer 908 is completed and the two devices are connected to each other, the controller 180 may display notification information 1020 indicating the connection result on the display unit 151. The fourth drawing of FIG. 10 illustrates an example thereof. When establishment of a network between the stereo system 906 and the notebook computer 908 is completed, information of the notebook computer 908 may be transmitted to the stereo system 906, and thus, an audio signal output from the notebook computer 908 may be output through the stereo system 906.

Meanwhile, in FIGS. 9A, 9B, and 10, the case in which only two IOT devices are controlled to be connected are illustrated and described as an example, but the present disclosure is not limited thereto. That is, two or more IOT devices may be connected to each other according to a user's drag input, and may exchange information with each other through a network established between the connected devices. Or, the connected devices may form a specific group, and according to a user selection, the devices included in the corresponding group may be simultaneously selected and driven to an operational state according to a user setting.

Meanwhile, in FIGS. 9A, 9B, and 10, the case in which the IOT devices selected according to a user selection establish a network so as to be connected is illustrated and described as an example, but the present disclosure is not limited thereto. That is, the user may select controlling related to any other operation than the aforementioned connection. In this case, in a state in which a previously captured screen (when operated in a photo mode or when operated in a virtual reality mode) or a screen in which a preview image is displayed is displayed, the controller 180 may display a graphic object related to a specific operational state of a currently selected device on the display unit 151, and control the specific operational state of the selected device on the basis of a user input applied to the displayed graphic object.

Meanwhile, in the above, the case in which a network is simply established between the IOT devices to connect the IOT devices has been described, but a specific device may also be set as a default output device by using a touch-and-drag input.

For example, as illustrated in FIG. 9A, 9B, or 10, the stereo system 906 and the notebook computer 908 may be connected to each other. In this case, an audio signal of the notebook computer 908 may be output through the stereo system 906. However, in a case in which the stereo system 906 and the notebook computer 908 are simply connected in this manner, when the controlling by the mobile terminal 100 may be released or when power of the notebook computer 908 or the stereo system 906 is turned off, the connection between the stereo system 906 and the notebook computer 908 may be released. However, in a case in which the stereo system 906 is connected as a default output device of the notebook computer 908, the stereo system 906 may be set as a basic output device outputting an audio signal of the notebook computer 908, regardless of release of controlling by the mobile terminal 100 or power OFF of the notebook computer 908 or the stereo system 906. In this case, even though any other output device (for example, a speaker (not shown)) is temporarily connected as an audio signal output device of the notebook computer 908 by the user, when the connection between the notebook computer 908 and the currently connected speaker is released due to power OFF or due to release of the connection by the user, the notebook computer 908 and the stereo system 906 may be connected to each other again.

For example, the default device connection may be set in a case in which devices connected to each other through a touch drag input are connected through a touch drag input again. In a case in which there are devices which have been set for default connection, when an operation according to an embodiment of the present disclosure starts, the controller 180 may immediately display a default connection state of the devices on a previously captured image (operational state in a photo mode or a virtual reality mode) or on an image (operational state in an augmented reality mode) displayed in a preview state. Thus, in this case, even though the user has not connected the devices, the plurality of IOT devices may be displayed in a mutually connected state (default connection state) on the display unit 151.

In addition, in the case of the devices connected in the default state, the controller 180 may display the devices connected in the default state differently from the case in which devices are simply connected. That is, in the case of the default connected devices, the controller 180 may display the default connection state by differentiating colors or thicknesses of a graphic object (for example, a linear graphic object) connecting images of the connected IOT device.

Meanwhile, in the above, it is described that an operation mode may be provided so that the user may select an IOT device positioned in a specific indoor area not displayed through a previously captured image or an image in a preview state and control an operation of the selected IOT device. In this case, the controller 180 may display a previously captured image corresponding to the "covered indoor area" on the display unit 151 by using a specific image corresponding to the "covered indoor area". Also, the specific image corresponding to the "covered indoor area" may be an image corresponding to "door" of the "covered indoor area".

That is, when the user captures a specific indoor area and stores the captured image as an image corresponding to a "covered indoor area", the user may select an image of an object corresponding to the "covered indoor area". In this case, the user may select a door for entering the specific indoor area, as an object corresponding to the "covered indoor area". When the "door" is selected, the controller 180 may analyze feature points of the image of the "door" and extract analyzed feature points. Also, on the basis of the extracted feature points, the controller 180 may identify the "door" from an image output on the display unit 151 in the operational state of the photo mode or the operational state of the augmented reality mode.

In this case, a region of the display unit 151 in which the image corresponding to the "door" is displayed may be distinguishably displayed. When the user selects the region of the display unit 151 corresponding to the image of the "door", the operational state of the virtual reality mode is entered and an image corresponding to the "covered indoor area" may be output on the display unit 151.

Figure 11:
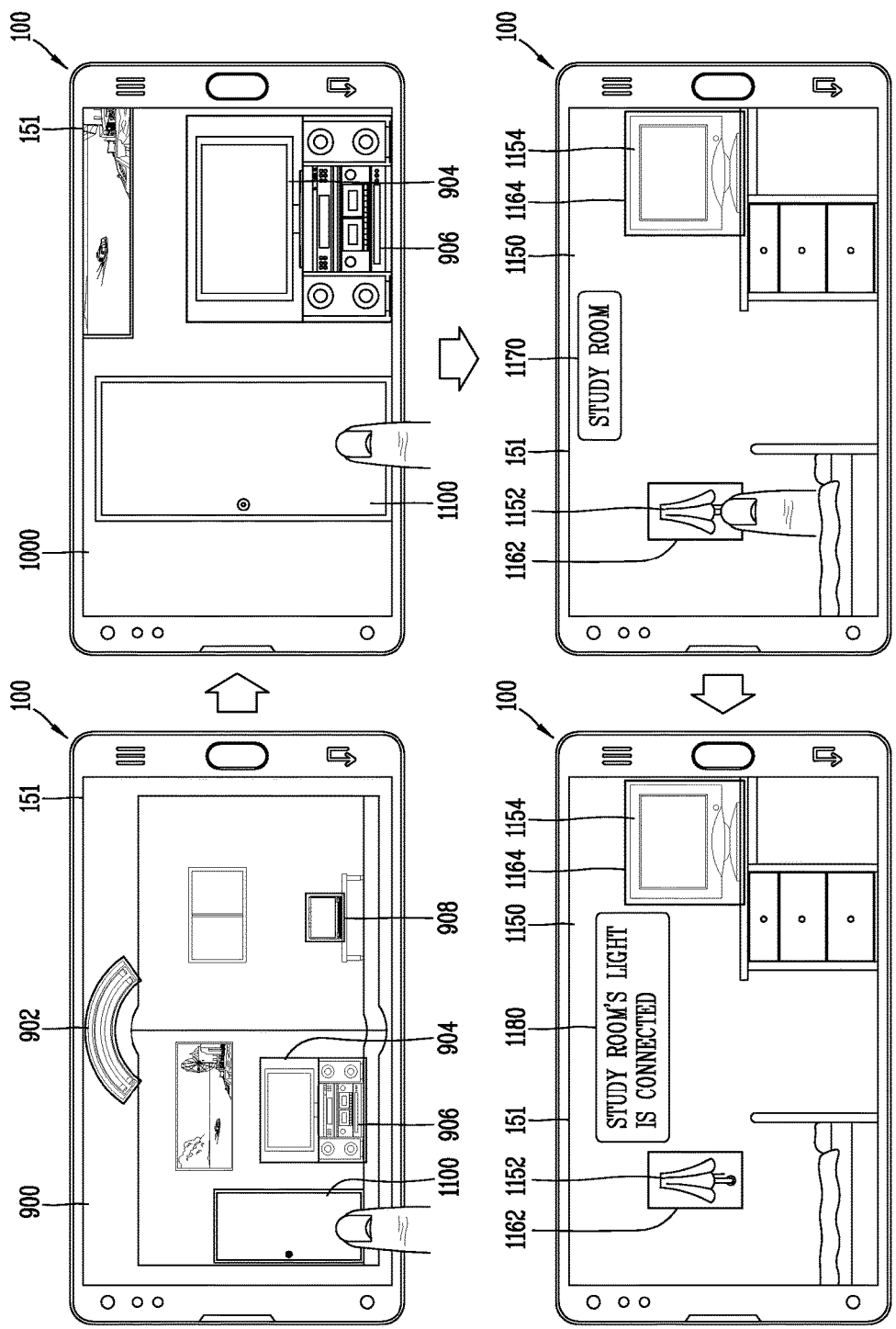
FIG. 11 is a view illustrating an example in which IOT devices positioned in a specific area whose interior is not displayed are controlled, in a mobile terminal according to an embodiment of the present disclosure.

FIG. 11 is a view illustrating an example in which IOT devices positioned in a specific area whose interior is not displayed, that is, in a "covered indoor area" are controlled, in a mobile terminal according to an embodiment of the present disclosure.

First, referring to the first drawing of FIG. 11, an example in which an image 1100 corresponding to the "covered indoor area" is distinguishably displayed on a previously captured image output on the display unit 151 in a state in which the mobile terminal 100 according to an embodiment of the present disclosure operates in a photo mode is illustrated. Also, referring to the second drawing of FIG. 11, an example in which an image 1100 corresponding to the "covered indoor area" is distinguishably displayed on a previously captured image output on the display unit 151 in a state in which the mobile terminal 100 according to an embodiment of the present disclosure operates in an augmented reality mode is illustrated.

In this state, when a user's touch input is applied to the region in which the image 1100 corresponding to the "covered indoor area" is displayed, the controller 180 may enter the virtual reality mode. That is, as illustrated in the third drawing of FIG. 11, the controller 180 may output a previously captured image regarding the "covered indoor area" on the display unit 151, as a response to the user's touch input as illustrated in the first drawing or the second drawing of FIG. 11. That is, the controller 180 may enter a state in which the aforementioned virtual reality mode operates.

Meanwhile, when the operational state of the virtual reality mode is entered, the controller 180 may identify IOT devices included in the image output on the display unit 151. For example, as illustrated in the third drawing of FIG. 11, when the IOT devices positioned in the "covered indoor area" are a lighting 1152 and a desktop computer 1154, the controller 180 display graphic objects 1162 and 1164 in the form of a frame around the identified IOT devices, that is, around the lighting 1152 and around the desktop computer 1154, to display the identified IOT devices distinguishably. Also, as illustrated in the third drawing of FIG. 11, the controller 180 may further display a graphic object 1170 including related information input from the user regarding the "covered indoor area", that is, a name such as "study room".

Meanwhile, in this state, the user may detect a user selection regarding an IOT device positioned in the "covered indoor area". That is, as illustrated in the third drawing of FIG. 11, when a user's touch input is detected in a region in which the lighting 1152 image is displayed in the image of the "covered indoor area", the controller 180 may detect that controlling or management of the lighting 1152 has been selected by the user. Then, according to the user selection, the controller 180 may change an operational state of the lighting 1152 or control IOT devices (IOT devices selected in the operational state of the photo mode or in the operational state of the augmented reality mode) positioned in the other indoor area and the lighting 1152 to establish a network. When the lighting 1152 is connected with other IOT devices via a network, the controller 180 may display corresponding notification information 1180 on the display unit 151 as illustrated in the fourth drawing of FIG. 11.

Figure 12:
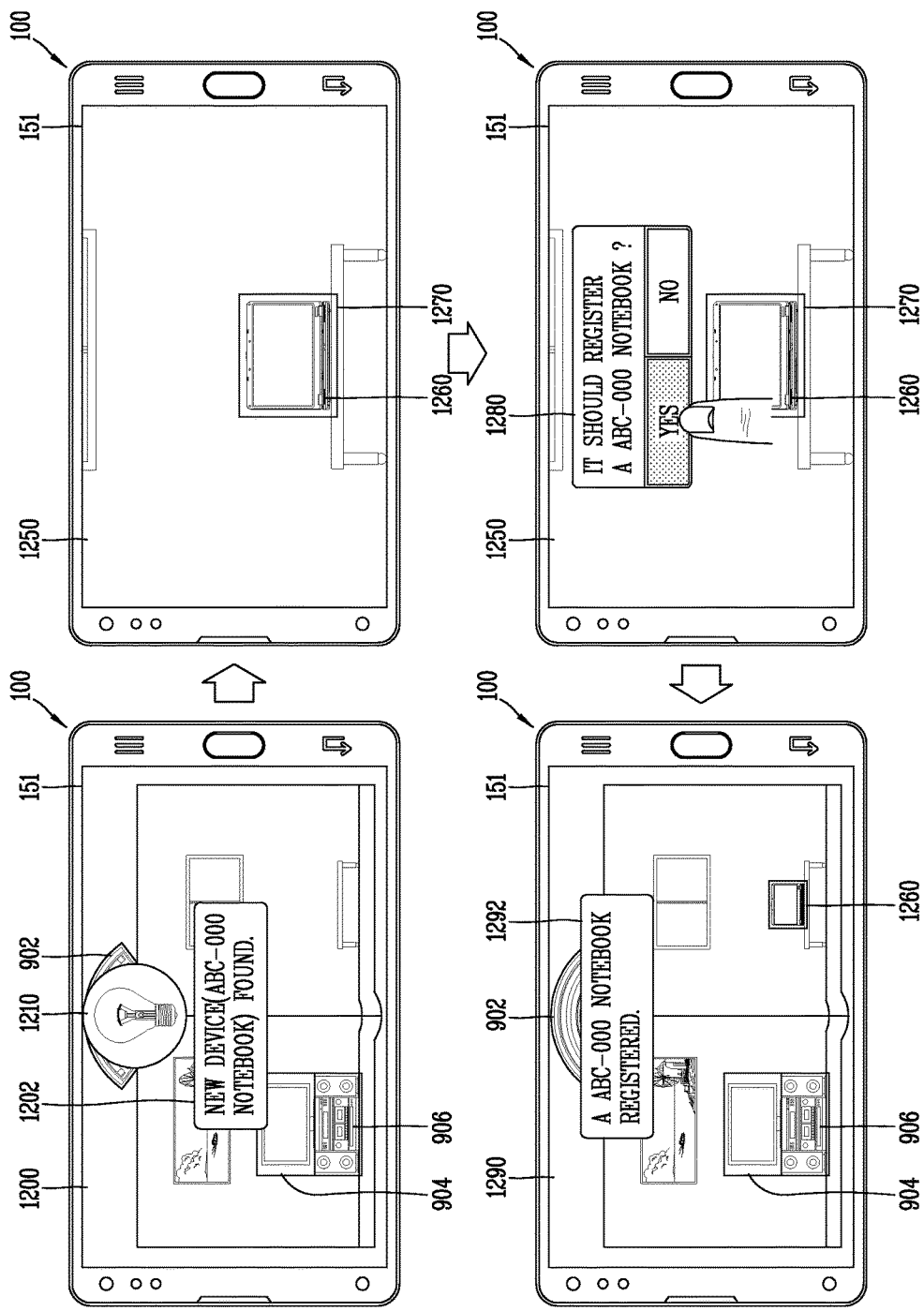
FIG. 12 is a view illustrating an example in which a new IOT device is detected and registered, in a mobile terminal according to an embodiment of the present disclosure.

Meanwhile, in the above, only the case in which the identified devices are connected or controlled has been described as an example, but in a case in which a new device is identified, the controller 180 of the mobile terminal 100 according to an embodiment of the present disclosure may inform the user about the identified new device. FIG. 12 is a view illustrating an example in which a new IOT device is detected and registered, in the mobile terminal 100 according to an embodiment of the present disclosure.

First, a first drawing of FIG. 12 illustrates an example in which a new IOT device is identified in a state in which the mobile terminal 100 according to an embodiment of the present disclosure operates in a photo mode.

In a case in which a new IOT device is installed and driven, the new IOT device may search for a connectable AP and connected to the searched AP. When connected to the AP, the new IOT device may transmit identification information thereof to the AP. In such a case, the AP may receive the identification information of the new IOT device, not previously registered IOT devices, and detect that the new IOT device has been installed.

After the new IOT device is registered, when a process of identifying an IOT device through a previously captured image of a specific indoor area or an image in a preview state is started in the mobile terminal 100 according to an embodiment of the present disclosure, the AP may transmit information related to the new IOT device to the mobile terminal 100. In this case, as illustrated in the first drawing of FIG. 12, the controller 180 may display information of the new IOT device received from the AP and display a graphic object 1210 and notification information 1202 indicating detection of the new IOT device.

In this case, the controller 180 may request the user to newly capture an image of a specific indoor area to be used in the photo mode or the virtual reality mode. In this case, the controller 180 may identify the new IOT device through a newly captured image and display the new IOT device distinguishably. Or, the controller 180 may enter an augmented reality mode and request the user to identify the new IOT device.

Also, as described above, when the new IOT device is detected, the controller 180 may display an image of the detected IOT device on a previously captured image, through an image sensed from the camera, and register the same. To this end, the controller 180 may perform a process for registering a position of the new IOT device.

In this case, the controller 180 may drive the camera sensor, and display a preview image received through the driven camera sensor on the display unit 151. The controller 180 may detect whether an image corresponding to the new IOT device is included in a preview image 1250. To this end, the controller 180 may receive identification information of the new IOT device from the AP, and collect appearance information corresponding to the received identification information from a preset external sever or a manufacturer of the new IOT device. Using the collected appearance information, whether an image including the image corresponding to the new IOT device has been sensed may be detected.

Meanwhile, as illustrated in the third drawing of FIG. 12, when an image including a new IOT device, that is, a notebook computer 1260, is sensed through the camera sensor, the controller 180 may identify the notebook computer 1260. In this case, a graphic object 1270 indicating that the notebook computer 1260 is an identified IOT device may be further displayed around the notebook computer 1260.

In a state in which the new IOT device, that is, the notebook computer 1260, is identified, a user may apply a touch to the region in which the new IOT device image is displayed, in order to register the new IOT device, that is, the notebook computer 1260. Here, a selection menu 1280 as illustrated in the third drawing of FIG. 12 may be displayed on the display unit 151.

In this state, when the user selects registration of the new IOT device, the controller 180 may display a position of the new IOT device on a previously captured image of the particular indoor area. For example, the controller 180 may analyze an image around the new IOT device and detect a region having feature points similar to the image around the new IOT device from the previously captured image.

That is, as illustrated in the third drawing of FIG. 12, when the new IOT device, that is, the notebook computer 1260, is placed on a table, the controller 180 may detect a region in which an image corresponding to the "table" on which the notebook computer 1260 is placed, from the previously captured image of the particular indoor area. And then, the controller 180 may display an image corresponding to the notebook computer 1260 in the detected region. The controller 180 may store the image including the new IOT device, that is, the notebook computer 1260 so that the image may be used as a previously captured image in an operation state of a photo mode or a virtual reality mode. Here, the displayed image of the notebook computer 1260 may be the image of the notebook computer 1260 included in the preview image in the second and third drawings of FIG. 12.

Figure 13:
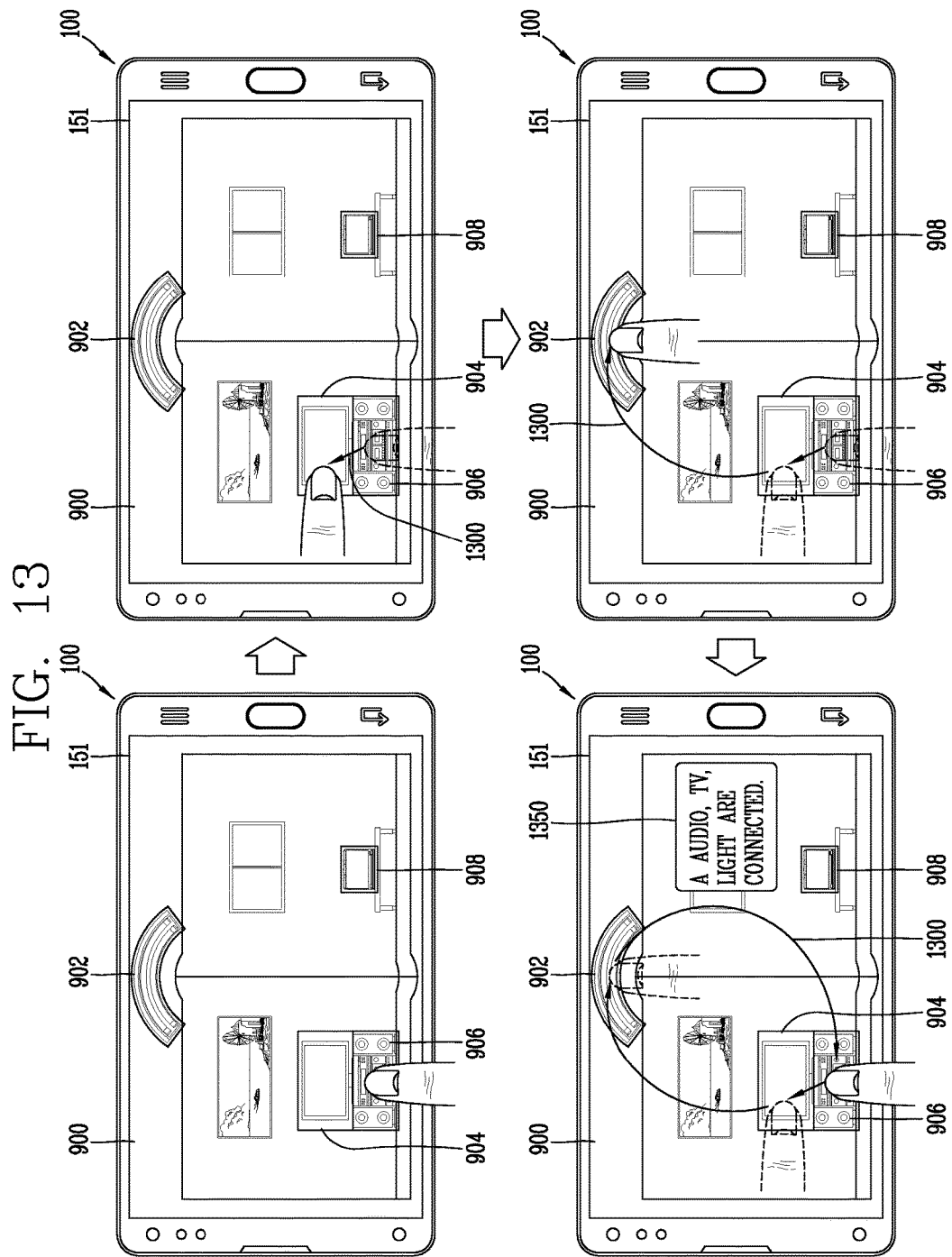
FIG. 13 is a view illustrating an example in which IOT devices displayed on a display unit are connected to each other on the basis of a touch input, in a mobile terminal according to an embodiment of the present disclosure.

Meanwhile, in the mobile terminal 100 according to an embodiment of the present disclosure, the user may previously connect a plurality of IOT devices and set an operational state, and store the same as set information. Also, in a preset mode, a plurality of corresponding IOT devices may set a connection and operational state to each other according to the connection state and operational state of the plurality of IOT devices stored as the set information. FIG. 13 is a view illustrating an example thereof.

Referring to FIG. 13, a first drawing of FIG. 13 illustrates an example in which the user selects a stereo system 906. In this state, as illustrated in a second drawing of FIG. 13, when the user applies a drag input dragged to a region of the display unit 151 on which an image of the TV 904 is displayed, the controller 180 may detect that the stereo system 906 and the TV 904 have been selected by the user.

In this state, as illustrated in a third drawing of FIG. 13, when the user continues to apply the drag input to a region of the display unit 151 on which an image of the lighting 902 is displayed, the controller 180 may detect that the lighting 902, following the stereo system 906 and the TV 904, has been continuously selected by the user.

In this state, when the user terminates the touch input, the controller 180 may control the stereo system 906, the TV 904, and the lighting 902 to establish a network in which the IOT devices, that is, the stereo system 906, the TV 904, and the lighting 902, are connected through a drag trace. However, as illustrated in a fourth drawing of FIG. 13, when a user's touch and drag input trace forms a closed loop, the controller 180 may generate set information in which the IOT devices selected according to the drag trace, that is the stereo system 906, the TV 904, and the lighting 902 are connected.

In this case, the set information may include information regarding a current state in which the devices (the lighting 902, the TV 904, and the stereo system 906) are connected and information regarding an operational state of each of the devices. When the user selects the generated set information, the controller 180 may connect IOT devices included in the selected set information and control the IOT devices to operate according to the operational state included in the set information. Accordingly, in a specific situation, that is, when the user watches movie, reads books, cooks, or sleeps, operational states of specific IOT devices mainly used or set by the user may be set to correspond to the specific situation in advance and stored. And then, the stored set information may be selected later, so that the operational state of the IOT devices mainly used or set by the user may be set at a time in the specific situation.

Meanwhile, the set information may be generated in plurality. Also, the user may set a specific situation corresponding to each of the generated set information. Also the controller 180 may classify the generated set information according to each situation and store the same.

For example, the user may connect the plurality of IOT devices to each other and store information regarding IOT devices operated in different operational states in each situation, as set information, according to a situation in which the user connects a plurality of IOT devices to each other and watches movie using the same, a situation in which the user read books, a situation in which the user sleeps, or a situation in which the user cooks, by using the connected states. In this case, the controller 180 may generate the IOT devices connected to each other and the operational states of the IOT devices, as set information related to different specific situations, for example, "movie", "reading", "sleep", and "cooking".

Meanwhile, in storing the set information, the controller 180 may generate a plurality of pieces of set information as information related to one situation according to a time at which the set information is generated, weather corresponding to the time, and the like. For example, in a case in which a time at which set information corresponding to a specific situation is generated is a night time (for example, 6:00 p.m. to 9:00 p.m.), the controller 180 may store the set information as information corresponding to "night time" regarding the currently set situation. Also, when set information corresponding to a specific situation is generated again, if a time at which the set information is generated is a day time (for example, 12:00 a.m. to 6:00 p.m.), the generated set information may be stored as different set information corresponding to the specific situation.

In addition, in classifying set information, the mobile terminal 100 according to an embodiment of the present disclosure may also use weather information of a time at which the set information has been stored. For example, in order to obtain weather information corresponding to a current time, the controller 180 may use weather information received from a preset external server (for example, a server of the Korea Metrological Administration, and the like). Also, when set information of IOT devices is generated according to a user selection, the controller 180 may store information regarding a current time and weather together with information regarding a specific situation input by the user. Thus, if points in time at which pieces of set information of the IOT devices have been generated are different or weathers are different, set information of the IOT devices regarding the same situation may be generate as different set information although set information correspond to the same situation.

Meanwhile, the controller 180 may determine whether the time and the weather are the same according to a preset reference. For example, the controller 180 may divide 24 hours into a plurality of time slots (6:00 a.m. to 12:00 a.m.: "morning", 12:00 a.m. to 6:00 p.m.: "daytime", 6:00 p.m. to 10:00 p.m.: "evening", and 10:00 p.m. to 6:00 a.m.: "nighttime"), and in case of set information generated at the same time slot, the controller 180 may regard the set information as information generated at the same time. Or, in case of weather, the controller 180 may determine weather according to a set weather reference (fair, cloudy, rainy, . . . ) and when the determined weather is the same, the controller 180 may regard it as set information corresponding to the same weather.

Meanwhile, when set information is generated, the controller 180 may detect whether there is any other set information corresponding to a time and weather at which the set information was generated. In a case in which any other set information generated previously is detected, the controller 180 may allow the user to select whether to replace the detected set information with the newly generated set information. In this case, when the user wants to replace the detected set information with the newly generated set information, the controller 180 may replace the existing set information corresponding to a time slot and/or a weather with the newly generated set information. However, when the user does not select replacement, the controller 180 may delete the currently newly generated set information or may store the newly generated set information as set information of a new name (for example, "MOVIE MODE (RAINY)2").

Meanwhile, in the above description, only weather information is mentioned, but various types of information detected through the mobile terminal 100 may also be stored together with the set information. For example, the controller 180 may store illumination, temperature, and the like, detected in the mobile terminal 100 together with the set information. In this case, even though a time slot and weather of the generated set information are the same, if illumination, temperature, or the like, thereof are different, the controller 180 may determine the set information as different information.

Figure 14A:
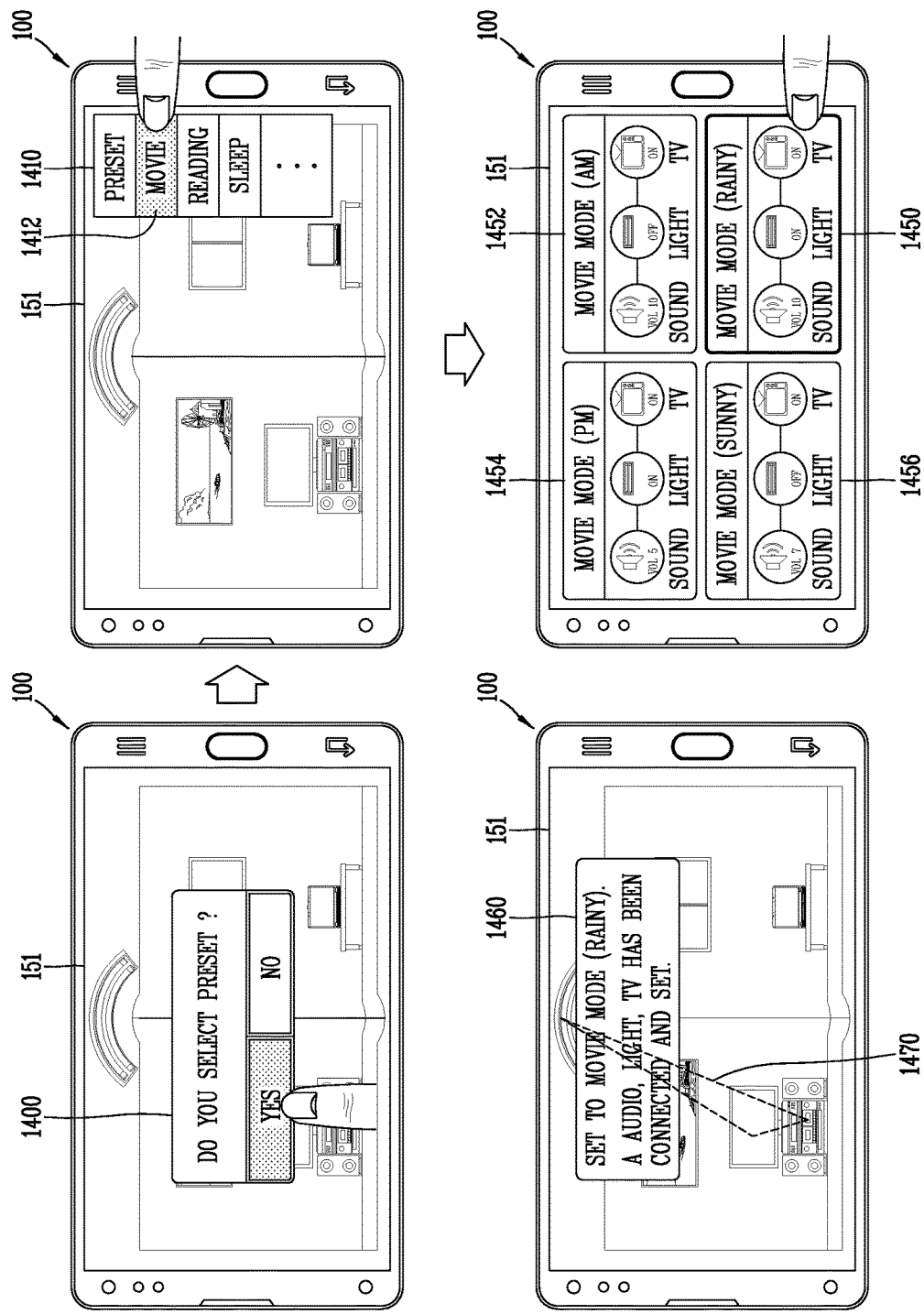

In this manner, a plurality of pieces of set information related to a specific situation may be generated in the mobile terminal 100 according to an embodiment of the present disclosure. Also, when any one specific situation related to the plurality of pieces of set information is selected by the user according to a "mode selection" of the user, the controller 180 may display information regarding the plurality of pieces of set information related to the specific situation on the display unit 151. When any one of the plurality of pieces of set information is selected, the controller 180 may simultaneously set connection of the plurality of IOT devices and operational states thereof according to the selected set information. FIG. 14A illustrates an example thereof.

Referring to FIG. 14A, first, a first drawing of FIG. 14A illustrates an example in which the user selects display of information regarding a plurality of pieces of set information. That is, as illustrated in the first drawing of FIG. 14A, when the user selects "preset mode" in a selection screen 1400, the controller 180 may display a list 1412 of set information stored up to now on the display unit 151.

Meanwhile, the set information may be stored according to specific related situations as described above. That is, as described above with reference to FIG. 13, in a case in which the generated set information has been stored as set information related to "movie", "reading", "sleep", and "cooking", the set information may be classified by "modes" according to specific situations related to each of the plurality of set information, such as a "movie mode", a "reading mode", a "sleep mode", a "cooking mode", and the like, so as to be stored.

In this case, before the user selects specific set information, the controller 180 may allow the user to select a specific situation related to set information desired to be selected.

Thus, as illustrated in a second drawing of FIG. 14A, the controller 180 may display a mode selection menu 1410 on the display unit 151.

Meanwhile, as described above, when the currently generated set information is set information related to "movie", "reading", "sleep", and "cooking", the controller 180 may display a mode selection menu 1410 on the display unit 151 to allow the user to select the "movie", "reading", "sleep", and "cooking".

In this case, at least one different set information may correspond to each mode. For example, each mode may include set information of IOT devices whose operational states have been set to be different according to an environment such as time, weather, and the like.

For example, when the user selects "movie mode 1412" from the mode selection menu 1410 as illustrated in the second drawing of FIG. 14A, the controller 180 may display pieces of image information 1450, 1452, 1454, and 1456 regarding set information including information regarding at least one IOT device related to the "movie mode" and an operational state of the IOT device as illustrated in the third drawing of FIG. 14A. In this case, the pieces of image information 1450, 1452, 1454, and 1456 displayed on the display unit may be information for displaying set information related to at least one IOT device operated differently according to time, weather, and the like, and an operational state of the IOT device as illustrated in the third drawing of FIG. 14.

For example, the first image information 1450 may display set information of IOT devices set to correspond to a situation ("MOVIE MODE (RAINY)") in which the user watches movie while it rains. Here, the TV 1204 displayed in the first image information may correspond to "TV" of the first image information, the lighting 1202 may correspond to "LIGHT", and the stereo system 1206 may correspond to "SOUND".

That is, as displayed in the first image information 1450, set information (set information corresponding to the first image information 1450) corresponding to a situation in which the user watches movie while it rains ("RAINY") may be information regarding a state in which the lighting 1202, the TV 1204, and the stereo system 1204 are connected to each other. Also, the set information may be information regarding a state in which the lighting 1202 and the TV 1204 are in an ON state and the stereo system 1204 may have the volume set to "10". Thus, as illustrated in the third drawing of FIG. 14A, when the user selects the first image information 1450, the controller 180 may control the lighting 1202, the TV 1204, and the stereo system 1206 such that the IOT devices are connected and operation states thereof are controlled according to set information corresponding to the first image information 1450.

Thus, as illustrated in the third drawing of FIG. 14A, when the first image information 1450 is selected, the lighting 1202, the TV 1204, and the stereo system 1206 may be connected, and the controller 180 may display the state in which the IOT devices are connected to each other, by a graphic object 1470 connecting the IOT devices according to a currently selected set information. Also, as illustrated in a fourth drawing of FIG. 14A, the controller 180 may display the currently selected set information and notification information 1460 indicating that a plurality of IOT devices have been connected according to the set information and operational states of the plurality of IOT devices have been set, on the display unit 151.

Meanwhile, the set information of the IOT devices described above may include set information received from a preset external server, a manufacturer of a mobile terminal according to an embodiment of the present disclosure, or a manufacturer of a related IOT device, as well as set information generated by the user. In this case, the received set information may correspond to a specific situation set by the user. Also, the received set information may include mutually different information regarding a specific time slot, weather, and the like.

Meanwhile, as illustrated in FIG. 14A, in a case in which operational states of the IOT devices are set according to any one of the set modes, the controller 180 may detect whether a currently detected surrounding situation is appropriate for operational states of the currently set IOT devices. When an IOT device operates not to be appropriate for the detected surrounding situation, the controller 180 may provide recommendation information related to the operational state of the IOT device.

For example, among the graphic objects illustrated in the third drawing of FIG. 14A, the controller 180 may turn on the TV 1204, sets the volume of the stereo system 1206 to "7", and turn off the lighting 1202 according to set information ("MOVIE MODE (SUNNY)") corresponding to the second information 1456. In this state, the controller 180 may sense intensity of illumination around the mobile terminal 100. Or, the controller 180 may sense intensity of illumination of an image received through the camera 121. The controller 180 may determine whether operational states of the set IOT devices are appropriate according to the sensed intensity of illumination and the set information. That is, when the currently sensed intensity of illumination is equal to or lower than a preset level, the controller may recommend the user to change an operational state of the lighting 1202 into an ON state even though a current time is a daytime.

Here, information for determining whether the detected surrounding environment and the operational states of the currently set IOT devices are appropriate may be received from a preset external server, a manufacturer of the mobile terminal 100 according to an embodiment of the present disclosure, a manufacturer of a related IOT device, and the like. Or, the controller 180 may determine whether the detected surrounding environment and the operational states of the currently set IOT devices are appropriate according to a value previously set by the user, for example, according to a set value with respect to a specific situation, a specific time, or specific weather.

In this case, when the set information corresponding to a specific situation, specific time, or specific weather corresponding to a value set by the user or a value received from the set external server, or the like, the controller 180 may determine whether operational states of the IOT devices are appropriate according to the set value or the value received from the external server.

Meanwhile, when the recommendation information is displayed and the user changes an operational state of at least one of the currently selected IOT devices according to the displayed recommendation information, the controller 180 may update information regarding an operational state of the IOT device included in the currently set information according to the currently changed operational state of the IOT device.

Meanwhile, in the above, the example in which a plurality of IOT devices are simultaneously connected and operational states thereof are set according to a user selection has been described, but in addition, the plurality of IOT devices may also be simultaneously connected and controlled in a different manner.

For example, the controller 180 may store set information in the form of history information. In this case, information regarding the plurality of IOT devices connected to each other and operational states of the IOT devices may be stored by points in time. In this case, when the user selects set information including connection of the IOT devices and operational states thereof at a specific point in time, the controller 180 may connect a plurality of IOT devices in the same manner as that of a state in which the plurality of IOT devices were connected at the specific point in time, and set the plurality of IOT devices to have the same operational states.

Here, in a case in which the set information is generated at a predetermined time period or in a case in which a connection state or an operational state of IOT devices is changed, that is, in a case in which a plurality of IOT devices are newly connected or a connection state thereof is changed, or whenever an operational state of the specific IOT device is changed, the controller 180 may generate new set information. The set information may further include information regarding a time at which corresponding information was stored. Also, the set information may further include information regarding weather at a time at which the corresponding information was stored.

Meanwhile, the set information may further include information regarding the number of times by which the set information has been selected. In this case, the controller 180 may display information regarding the number of times by which the set information has been selected, for user recognition, and may display set information which has been selected by more than a predetermined number of times or set information most frequently selected by the user as user preferred set information. For example, the controller 180 may differentiate the user preferred set information from other set information by using a graphic object in the form of a frame or in different colors. Or, the controller 180 may first display the user preferred set information than other set information so that the user may easily discover his or her preferred set information.

Meanwhile, in the above, for the purposes of description, it is assumed that the mobile terminal 100 operates in the photo mode, but the present disclosure is not limited thereto. That is, even when the mobile terminal 100 operates in the aforementioned augmented reality mode or the virtual reality mode, a state in which a plurality of IOT devices are currently connected may be stored as specific set information according to a user selection.

Meanwhile, in the above, the example in which the user selects specific set information and operational states of the IOT devices are simultaneously controlled has been described with reference to FIG. 14A. However, the controller 180 may release connection of any one IOT device included in the specific set information according to a user selection. FIG. 14B illustrates an example thereof.

First, referring to a first drawing of FIG. 14B, the first drawing of FIG. 14B illustrates an example in which the lighting 1202, the TV 1204, the stereo system 1206, and a blind 1472 of a window are connected according to set information selected by the user. In this case, as illustrated in FIG. 14A, a state in which the lighting 1202, the TV 1204, the audio 1206, and the blind 1472 are connected may be indicated by the graphic object 1470.

In this state, the controller 180 may display set information of the IOT devices currently selected according to a user selection on the display unit 151. That is, as illustrated in the first drawing of FIG. 14B, when the user applies a touch input to the display unit 151, the controller 180 may determine the touch input as an input of the user for checking the set information. Then, as illustrated in the second drawing of FIG. 14B, the controller 180 may display the currently selected set information 1480 on the display unit 151.

Meanwhile, in this state, the controller 180 may sense a user's input for releasing a connection state of any one of the IOT devices connected according to the set information 1480. For example, as illustrated in the second drawing of FIG. 14B, in a state in which the set information of the IOT devices is displayed as illustrated in the second drawing of FIG. 14B, when any one of the IOT devices is selected, the controller 180 may release a connection state of the IOT device. Accordingly, as illustrated in the third drawing of FIG. 14B, when a user's input applied to a region in which a graphic object 1482 corresponding to any one IOT device, that is, the blind 1472, is sensed in the set information 1480 displayed on the display unit 151, the controller 180 may detect the user's input as an input for releasing connection of the blind 1472 among the IOT devices connected according to the set information 1480. Thus, the controller 180 may control the lighting 1202, the TV 1204, the stereo system 1206, and the blind 1472 such that connection of the blind 1472, among the IOT devices connected according to the set information 1480. In a case in which connection of the blind 1472 is released in this manner, the controller 180 may display a state in which the blind 1472 is not connected to the lighting 1202, the TV 1204, and the stereo system 1206, through a graphic object 1470 as illustrated in a fourth drawing of FIG. 14B. Also, the controller 180 may display notification information indicating the release of connection of the blind 1472 and information regarding the currently connected IOT devices on the display unit 151.

Meanwhile, in a case in which a connection state of a specific IOT device is released, the controller 180 may update the currently selected set information according to the IOT device currently released in connection. Or, conversely, in a case in which a specific IOT device is additionally connected, the controller 180 may update the currently selected set information to include the additionally connected IOT device.

Meanwhile, according to the above descriptions, when an operational state of a specific device is changed according to a user selection, the controller 180 of the mobile terminal 100 according to an embodiment of the present disclosure may provide a preview function displaying a changing surrounding environment. FIG. 15 illustrates an example in which a preview function is provided.

First, referring to the first drawing of FIG. 15, the first drawing of FIG. 15 illustrates an example in which the lighting 902 is selected by the user in a state in which the mobile terminal 100 according to an embodiment of the present disclosure operates in a photo mode. In this case, the controller 180 may display a function related to the lighting 902, that is, a graphic object 1500 for adjusting intensity of illumination, on the display unit 151. A second drawing of FIG. 15 illustrates an example thereof.

In this case, as illustrated in the second drawing of FIG. 15, in a state in which the graphic object 1500 for adjusting intensity of illumination of the lighting 902 is displayed, when a user's touch input is applied to the graphic object 1500, the controller 180 may change intensity of illumination of the lighting 902 according to the touch input. In this case, the controller 180 may set the preview region and display a surrounding environment changed according to the changed intensity of illumination through an image of the preview region.

That is, as illustrated in a third drawing of FIG. 15, one region centered around the IOT device whose operational state has been changed, that is, a preview region 1510, may be formed on the display unit 151. Accordingly, the display unit 151 may be divided into the preview region 1510 and other regions. In this state, the controller 180 may change brightness of the preview region 1510 according to intensity of illumination of the lighting 902 changed according to the touch input. Thus, brightness of the interior and exterior of the preview region 902 may be displayed to be different, which may indicate an influence of a surrounding environment changed according to intensity of illumination of the lighting 902. The controller 180 may display a check menu 1530 allowing the user to check whether to maintain the currently changed operational state on the display unit 151. According to a user selection on the check menu 1530, intensity of illumination of the lighting 902 may be changed or changed intensity of illumination may be maintained as is.

Meanwhile, FIG. 15 illustrates an example in which the mobile terminal 100 according to an embodiment of the present disclosure operates in the photo mode. Thus, in changing brightness of the preview region 1510, the controller 180 may further consider intensity of illumination according to an operational state of the lighting 902 before being changed and a time at which an operation state of the lighting 902 is requested to be changed. That is, the controller 180 may change brightness of the previously captured image 900 output on the display unit 151 according to intensity of illumination of the lighting 902 before being changed, and also, change brightness to be darker or brighter according to whether the current time is nighttime or daytime. In this state, the controller 180 may display an influence according to the intensity of illumination of the lighting 902 after being changed on the preview region 1510.

Meanwhile, when the mobile terminal 100 according to an embodiment of the present disclosure operates in the virtual reality mode, an influence according to a change in an operational state of a selected specific IOT device may also be displayed in a similar manner. Meanwhile, when the mobile terminal according to an embodiment of the present disclosure operates in the augmented reality mode, the controller 180 may immediately form the preview region 1510 on an image (image output in a preview state) output on the display unit 151. In this case, the controller 180 may cause brightness of the preview region 1510 to be changed according to a change in an operational state of the lighting 902 by the user, thus displaying an influence according to a change in the intensity of illumination of the lighting 902. This is because, in the case of the augmented reality mode, an image actually sensed through the camera sensor, rather than a previously captured image, is used, unlike other modes.

Figure 16A:
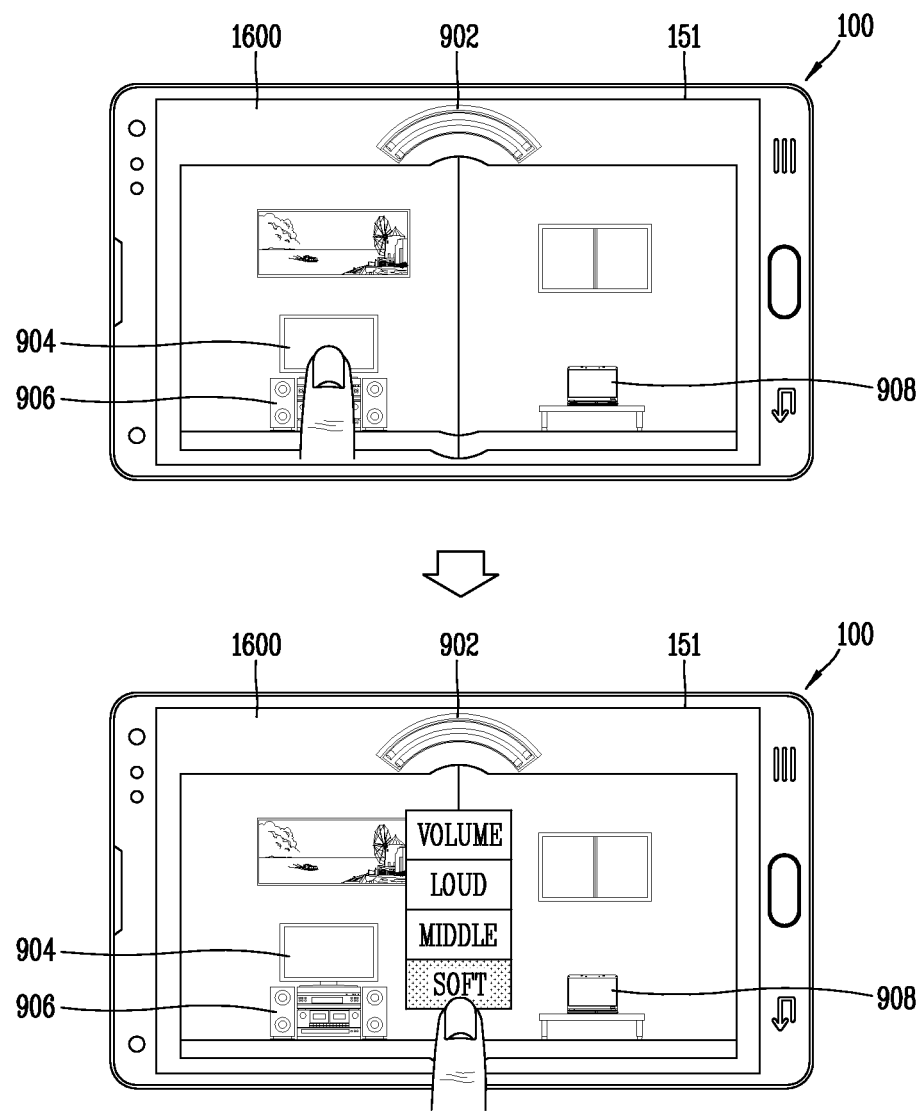
FIGS. 16A and 16B are views illustrating examples in which different control interfaces are provided according to sizes of images of an IOT device displayed on a display unit, in a mobile terminal according to an embodiment of the present disclosure.
Figure 16B:
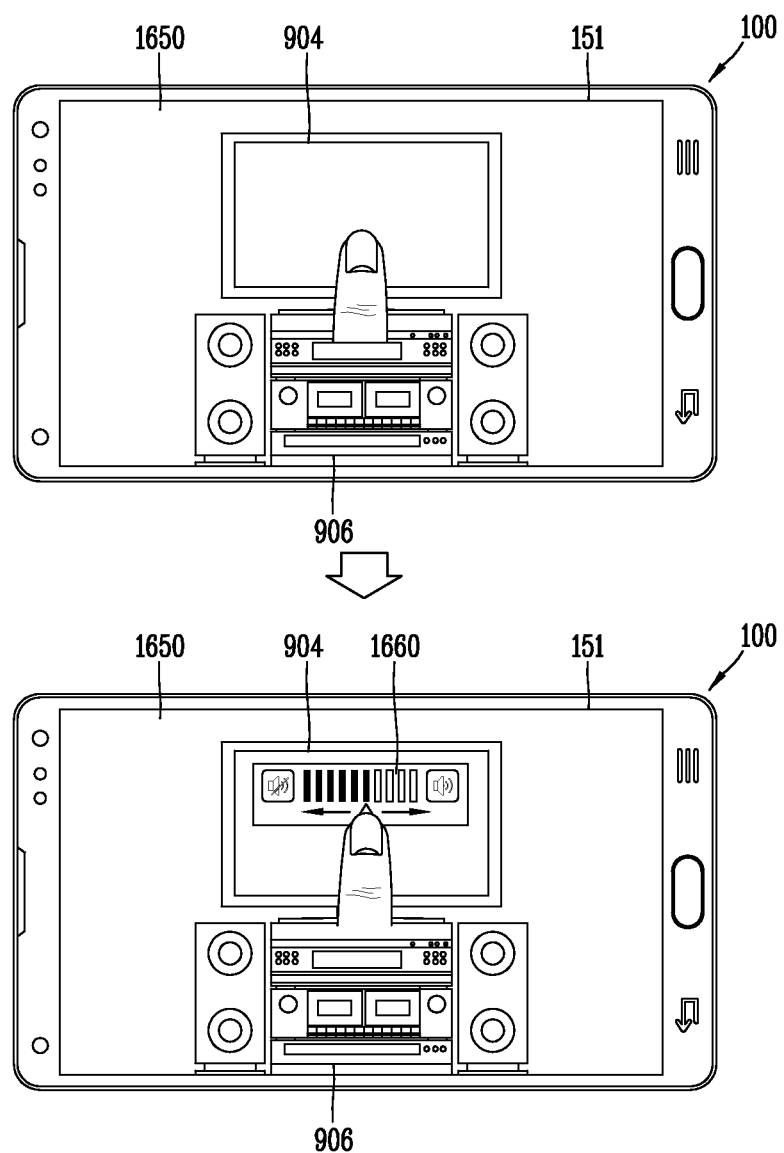

Meanwhile, according to the above descriptions, the mobile terminal 100 according to an embodiment of the present disclosure provides different control interfaces according to sizes of a specific IOT device image displayed on the display unit 151. FIGS. 16A and 16B illustrate examples in which different control interfaces for controlling an IOT device are displayed according to an image of the IOT device displayed on the display unit 151.

First, referring to FIG. 16A, FIG. 16A illustrates a control interface displayed when a size of an IOT device image displayed on the display unit 151 is smaller than a preset size. For example, as illustrated in a first drawing of FIG. 16A, in a state 1600 in which the IOT devices are displayed to have a size smaller than a preset size, when the user selects a specific IOT device without an operation of zooming in, the controller 180 may display a corresponding control interface screen on the display unit 151.

For example, when it is assumed that a touch input applied by the user to a region in which an image of the TV 904 is displayed is sensed as a user's input for controlling the volume of the TV 904, the controller 180 may display a control interface screen 1610 for controlling the volume of the TV 904 according to a user input as illustrated in FIG. 16A. Also, in this case, the displayed control interface screen 1610 may include only menus for simply controlling the volume of the TV 904 by three stages of "LOUD", "MIDDLE", and "SOFTLY" as illustrated in a second drawing of FIG. 16A.

Meanwhile, in a case in which the user zooms in or in a case in which the mobile terminal 100 according to an embodiment of the present disclosure operates in the augmented reality mode and the user approaches in a direction in which a specific IOT device is positioned, an image of the specific IOT device may be displayed 1650 to have a size equal to or greater than a preset size as illustrated in FIG. 16B. In this state, as illustrated in FIG. 16B, when the user applies a touch input to a region in which the IOT device image is displayed, the controller 180 may display a control interface screen 1660 for controlling the volume of the TV 904 in response thereto.

In this case, unlike the first drawing of FIG. 16A, the displayed control interface screen 1660 may include graphic objects for minutely controlling the volume of the TV 904. That is, as illustrated in the second drawing of FIG. 16B, the controller 180 may adjust the volume in more minute unit according to a user's drag input, and accordingly, the user may more minutely control the volume of the TV.

Meanwhile, in the above, the example in which different control interface screens for controlling the IOT device are displayed according to a size of the IOT device image displayed on the display unit 151 has been described. However, alternatively, whether to control the IOT device may be determined according to a size of the IOT device image. That is, in a state in which an image of an IOT device is displayed to have a size smaller than a preset size, when the image of the IOT device is displayed to have a size equal to or greater than the preset size according to zooming in or a user movement in position in the augmented reality mode, the controller 180 of the mobile terminal 100 according to an embodiment of the present disclosure may display a control interface screen for controlling an operational state of the IOT device on the display unit 151.

Meanwhile, in the above, it has been described that the mobile terminal 100 according to an embodiment of the present disclosure grants a right to control a specific IOT device to another mobile terminal which has not been registered.

Figure 17:
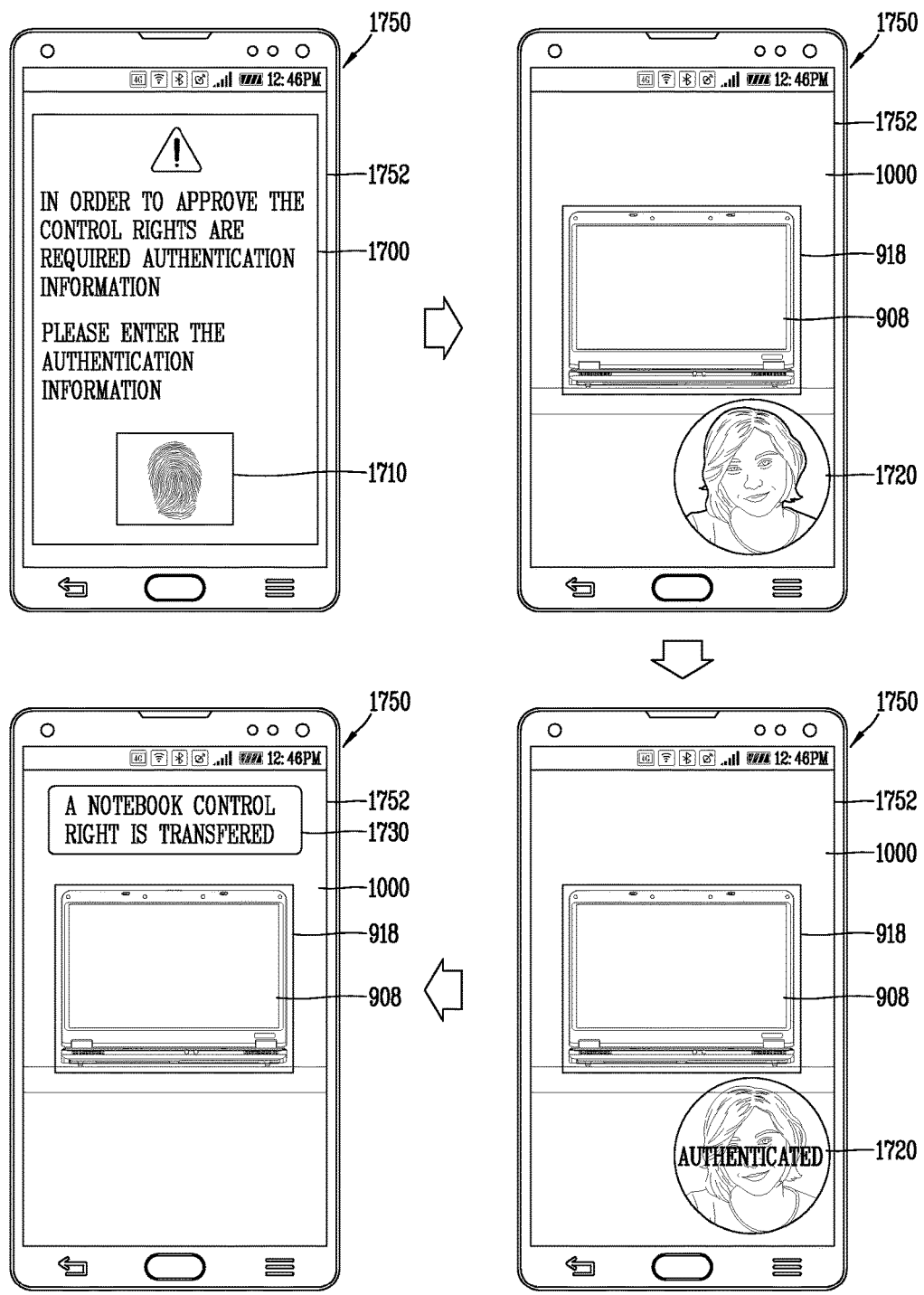
FIG. 17 is a view illustrating an example in which a right to control a specific IOT device is granted to a different mobile terminal, in a mobile terminal according to an embodiment of the present disclosure.

FIG. 17 is a view illustrating an example in which the mobile terminal according to an embodiment of the present disclosure grants a right to control a specific IOT device to another mobile terminal.

For example, in a case in which a non-registered mobile terminal (hereinafter, referred to as a second mobile terminal 1750) is the mobile terminal according to an embodiment of the present disclosure, when the second mobile terminal 1750 accesses an AP of a specific indoor area, the second mobile terminal 1750 may request the AP to determine whether the second mobile terminal 1750 is a previously registered mobile terminal. That is, the controller of the second mobile terminal 1750 may transmit identification information thereof to the AP, and the AP may determine whether the second mobile terminal is a previously registered mobile terminal according to the received identification information. When the second mobile terminal is not a previously registered mobile terminal, the AP may transmit a corresponding result to the second mobile terminal.

In this case, the second mobile terminal 1750 may receive the result indicating that the second mobile terminal 1750 has not been registered. Then, the second mobile terminal 1750 may request a right to control an IOT device positioned in the specific indoor area according to a user selection. A first drawing of FIG. 17 illustrates an example thereof.

Referring to the first drawing of FIG. 17, the controller of the second mobile terminal 1750 may display that the second mobile terminal 1750 has not been registered through notification information 1700 displayed on a display unit 1752, and may request a control right according to a user selection. In this case, whether to request a control right may be made according to whether previously registered authentication information (hereinafter, referred to as "first authentication information") is input.

Here, the first authentication information input through the second mobile terminal 1750 may be authentication information previously stored in the AP. The first authentication information may be authentication information of the user having a right to grant a right to control the IOT device with respect to the second mobile terminal 1750. Here, the user having a right to grant a right to control the IOT device may be a user of a previously registered mobile terminal.

Thus, when authentication (first authentication information) of a different user, that is, a user of the previously registered mobile terminal, is input to an authentication information input column 1710, the second mobile terminal 1750 may transmit the same to the AP. When the input first authentication information matches the user authentication information previously registered in the AP, a process of requesting a right to control the IOT device may be performed in the second mobile terminal 1750.

Meanwhile, when the process of granting a right to control the IOT device is performed, the controller of the second mobile terminal 1750 may display an image sensed through a sensor of a rear camera on the display unit 1752 in a preview state. Also, the controller may request a right to control the IOT device according to whether an image of the specific IOT device is included in the image displayed in the preview state or according to whether another authentication information (hereinafter, referred to as second authentication information) is input. Here, both the first authentication information and the second authentication information may be authentication information of the user of the previously registered mobile terminal and may be different authentication information. For example, the first authentication information may be fingerprint information, and the second authentication information may be face recognition information.

In this case, as illustrated in a second drawing of FIG. 17, in a case in which an image of a notebook computer 908 is displayed on the display unit 1752 of the second mobile terminal 1750, the controller of the second mobile terminal 1750 may determine whether second authentication information has been input. Also, when second authentication information (for example, face information) is input as illustrated the second drawing of FIG. 17, the controller of the second mobile terminal 1750 may determine whether the input authentication information matches the authentication information previously registered in the AP.

When the input authentication information does not match the authentication information previously stored in the AP according to the matching result, a right to control the IOT device whose image is displayed on the display unit 1752, by the second mobile terminal 1750, may be limited. However, when the input authentication information matches the authentication information previously stored in the AP, the controller of the second mobile terminal 1750 may display the matching result 1720 on the display unit 1752. Also, according to the matching of the second authentication information, notification information 1730 indicating that the right to control the IOT device that is, the notebook computer 908, whose image is displayed on the display unit 1752, has been granted may be displayed on the display unit 1752.

Meanwhile, the first authentication information may be used to grant a control right, and the second authentication information may be used to provide a right to selectively control a specific IOT device. Accordingly, in a case in which the first authentication information is registered as fingerprint information and the second authentication information is registered as face recognition information, the user of the previously registered mobile terminal may be given a right to control a specific IOT device by simply changing a state of gripping the mobile terminal 1750. That is, when the user grips the second mobile terminal 1750 in an erected state, the controller of the second mobile terminal 1750 may obtain a face image using an image received from a front camera and use the obtained face image as second authentication information. Thus, since the user of the previously registered mobile terminal grips the second mobile terminal 1750 to obtain a face image of the user of the previously registered mobile terminal, thus providing a right to control the specific IOT device to the second mobile terminal.

However, in a case in which the user grips the second mobile terminal 1750 in a laid-down state, a face image may not be obtained through the front camera of the second mobile terminal 1750. Thus, even though an image of a specific IOT device is displayed on the display unit 1752 of the second mobile terminal 1750, the IOT device may not be controlled by the second mobile terminal 1750.

Meanwhile, although not shown, when the right to control the specific IOT device is granted to the second mobile terminal 1750, a control limit may also be set together with the granting of a right to control the specific IOT device. For example, while granting the right to control the specific IOT device, the user of the previously registered mobile terminal may set a limit of an operational state of the specific IOT device that may be changed by the second mobile terminal 1750. That is, for example, when the volume of the stereo system 906 which can be maximally set is 20, the user of the previously registered mobile terminal may limit the volume that can be changed, to 15 as well as granting the right to control the stereo system 906 to the second mobile terminal 1750. In this case, the volume of the stereo system 906 may not be increased to exceed 15 through the second mobile terminal 1750.

Meanwhile, the user of the second mobile terminal 1750 may also grant a right to control a specific IOT device granted to the second mobile terminal 1750 to another mobile terminal (hereinafter, referred to as a "third mobile terminal"). The process of granting a right to control may be performed in a manner similar to that of the process in which the second mobile terminal 1750 is granted a right to control the notebook computer 908 as illustrated in FIG. 17.

In this case, however, the second mobile terminal 1750 may not grant a right to control greater than the right to control granted to the second mobile terminal 1750, to the third mobile terminal. That is, as described above, in a case in which a size of the volume that can be maximally increased by the second mobile terminal 1750 is allowed to be 15, the user of the mobile terminal 1750 may set the size of the permissible volume only up to 15 when granting the right to control the stereo system 906 to the third mobile terminal.

The effect of the mobile terminal and the control method thereof according to embodiments of the present disclosure will be described.

According to at least one of the embodiments of the present disclosure, since IOT devices positioned in an indoor area are identified and displayed by using a previously captured indoor image or a preview image sensed by a camera of the mobile terminal, the user may easily identify and control the IOT devices.

Also, according to at least one of the embodiments of the present disclosure, since the IOT devices are controlled on the basis of a user's touch input applied through the previously captured image or the preview image sensed by the camera of the mobile terminal displayed on the display unit, the user may manage the IOT devices more easily by intuition.

Also, according to at least one of the embodiments of the present disclosure, since IOT devices are identified and controlled through any one of an indoor image previously captured on the basis of a state in which the mobile terminal is gripped and a preview image sensed by the camera of the mobile terminal, a user interface corresponding to a user's intuitional behavior for identifying and controlling an IOT device may be provided.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a camera;
    a memory configured to store information;
    a touchscreen configured to display information;
    a transceiver configured to perform wireless communication with at least one device; and
    a controller configured to:
    cause the touchscreen to display an augmented reality (AR) image comprising a plurality of devices located in a specific indoor area where the mobile terminal is located and which can be changed according to an orientation direction of the camera, wherein the AR image comprises displayed information of each of the plurality of devices next to each corresponding displayed device in the AR image;
    control two or more devices of the plurality of devices selected from the AR image to be connected to each other;
    cause the memory to store set information in response to a storing command, the stored set information comprising connection information of the two or more devices and operational state information of the two or more devices when the connection information is stored; and
    cause the two or more devices to operate according to the stored operational state information in response to a selection of the stored set information,
    wherein the controller is further configured to perform authentication of the mobile terminal for controlling the plurality of devices, the authentication comprising:
    establishing a connection with an access point via the transceiver, wherein the access point includes information related to the plurality of devices in the specific indoor area;
    causing the touchscreen to display notification information indicating that the mobile terminal is not registered;
    causing the transceiver to transmit a first authentication information received from a user when the first authentication information matches user authentication information previously registered at the access point;
    causing the touchscreen to display an image sensed by the camera as a preview image comprising a specific device of the plurality of devices;
    receiving second authentication information from the user different from the first authentication information in a state where the specific device of the plurality of devices is displayed on the preview image; and
    obtaining authority to control the specific device displayed on the preview image when the second authentication information matches another user authentication information previously registered at the access point.

2. The mobile terminal of claim 1, wherein the controller is further configured to:
    cause the set information to be stored to be associated with a specific situational setting; and
    cause the memory to differently store multiple set information associated with a same specific situational setting based on corresponding surrounding environment information detected by the mobile terminal when each of the multiple set information is stored.

3. The mobile terminal of claim 2, wherein the surrounding environment information comprises a current time and weather information.

4. The mobile terminal of claim 1, wherein the controller is further configured to cause the touchscreen to display information for changing an operational state of at least one of the two or more devices based on surrounding environment information detected by the mobile terminal.

5. The mobile terminal of claim 4, wherein the displayed information for changing the operational state of the at least one of the two or more devices is further based on the detected surrounding environment information and a current operational state of the two or more devices.

6. The mobile terminal of claim 5, wherein the controller is further configured to update the selected set information when an operational state of at least one of the two or more devices is changed according to the displayed information.

7. The mobile terminal of claim 1, wherein the controller is further configured to:
 cause the touchscreen to display graphic objects corresponding to each of the two or more devices; and
 cause a selected one of the two or more devices to be disconnected when a graphic object corresponding to the selected one device is selected.

8. The mobile terminal of claim 1, wherein the controller is further configured to select the two or more devices from the plurality of devices for the stored set information according to a drag trace received via the touchscreen, wherein the drag trace forms a loop intersecting each of the two or more devices in the displayed image.

9. The mobile terminal of claim 1, wherein the controller is further configured to cause the set information to be stored when a preset period expires or when a connection state of one of the two or more devices is changed.

10. The mobile terminal of claim 1, wherein the controller is further configured to cause the touchscreen to display a control interface for each of the two or more devices, wherein the control interfaces are different based on a size of the corresponding device in the displayed image.

11. The mobile terminal of claim 10, wherein the size of the corresponding device in the displayed image is changed according to zooming-in or zooming-out of the image or according to movement of the mobile terminal within the specific indoor area.

12. The mobile terminal of claim 10, wherein the controller is further configured to:
 calculate a ratio of the size of the corresponding device in the displayed image to a total size of a display of the touchscreen; and
 change a displayed control interface based on the calculated ratio, wherein the displayed control interface is displayed to have a higher granularity of control of the corresponding device as a size of the corresponding device in the displayed image is increased.

13. The mobile terminal of claim 1, wherein the controller is further configured to:
 cause the touchscreen to display a graphic object related to an operational state of a selected device of the two or more devices in response to a selection of the selected device in the displayed image; and
 control the selected device based on a touch input to the displayed graphic object.

14. The mobile terminal of claim 13, wherein the controller is further configured to cause the touchscreen to display an effect on the displayed image according to a change in the operational state of one of the two or more devices.

15. The mobile terminal of claim 1, further comprising a sensor configured to detect a state in which the mobile terminal is gripped,
 wherein the preview image obtained by the camera or a previously stored image is displayed based on the detected state in which the mobile terminal is gripped.

16. The mobile terminal of claim 15, wherein the controller is further configured to cause the touchscreen to display another previously stored image corresponding to another indoor area when a specific object included in the previously stored image is displayed on the touchscreen and a selection input is received to the displayed specific object,
 wherein the displayed another previously stored image includes another plurality of devices.

17. The mobile terminal of claim 16, wherein the controller is further configured to connect one of the another plurality of devices with one of the two or more devices.

18. The mobile terminal of claim 16, wherein the controller is further configured to cause the touchscreen to display an indicator corresponding to a region of the specific object on the displayed image when the another previously stored image is stored.

19. The mobile terminal of claim 1, wherein the controller is further configured to:
 determine that the mobile terminal has entered the specific indoor area when the mobile terminal is connected to the access point.

20. A method for controlling a mobile terminal, the method comprising:
 displaying an augmented reality (AR) image comprising a plurality of devices located in a specific indoor area where the mobile terminal is located and which can be changed according to an orientation direction of a camera of the mobile terminal, wherein the AR image comprises displayed information of each of the plurality of devices next to each corresponding displayed device in the AR image; and
 controlling two or more of the plurality of devices to be connected to each other;
 storing a set information item in response to a storing command, the stored set information comprising connection information of the connected two or more of the plurality of devices and operational state information of the connected two or more of the plurality of devices when the connection information is stored;
 displaying a plurality of set information items wherein each of the plurality of set information items are displayed differently based on surrounding environment information detected when each corresponding set information item was stored; and
 causing at least part of the plurality of devices to operate according to the operation states when storing the set information item in response to a selection of the stored set information,
 wherein the method further comprises performing authentication of the mobile terminal for controlling the plurality of devices, the authentication comprising:
 establishing a connection with an access point, wherein the access point includes information related to the plurality of devices in the specific indoor area;
 displaying notification information indicating that the mobile terminal is not registered;
 transmitting a first authentication information received from a user when the first authentication information matches user authentication information previously registered at the access point;

displaying an image sensed by the camera as a preview image comprising a specific device of the plurality of devices;
receiving a second authentication information from the user different from the first authentication information in a state where the specific device of the plurality of devices is displayed on the preview image; and
obtain authority to control the specific device displayed on the preview image when the second authentication information matches another user authentication information previously registered at the access point.

\* \* \* \* \*